(12) United States Patent
Jung et al.

(10) Patent No.: US 12,232,133 B2
(45) Date of Patent: Feb. 18, 2025

(54) METHOD AND APPARATUS FOR CHANNEL ACCESS IN COMMUNICATION SYSTEM SUPPORTING UNLICENSED BAND

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Nam Ho Hur, Daejeon (KR); Heung Mook Kim, Daejeon (KR); Dong Joon Choi, Daejeong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 17/697,738

(22) Filed: Mar. 17, 2022

(65) Prior Publication Data

US 2022/0312468 A1    Sep. 29, 2022

(30) Foreign Application Priority Data

Mar. 18, 2021 (KR) .................. 10-2021-0035371
Jul. 14, 2021 (KR) .................. 10-2021-0092449
Feb. 24, 2022 (KR) .................. 10-2022-0024174

(51) Int. Cl.
*H04W 72/12* (2023.01)
*H04W 72/23* (2023.01)
*H04W 74/02* (2009.01)

(52) U.S. Cl.
CPC .......... *H04W 72/23* (2023.01); *H04W 74/02* (2013.01)

(58) Field of Classification Search
CPC ............ H04W 72/1268; H04W 72/23; H04W 74/006; H04W 74/02; H04W 74/0808; Y02W 30/56

See application file for complete search history.

(56) References Cited

U.S. PATENT DOCUMENTS

| | | |
|---|---|---|
| 10,485,020 B2 | 11/2019 | Vajapeyam et al. |
| 2020/0021999 A1 | 1/2020 | Park et al. |
| 2020/0037309 A1 | 1/2020 | Sengupta et al. |
| 2020/0275485 A1 | 8/2020 | Babaei et al. |
| 2020/0322982 A1 | 10/2020 | Wu |
| 2020/0351056 A1 | 11/2020 | Oh et al. |
| 2020/0383095 A1 | 12/2020 | Moon et al. |
| 2021/0007068 A1 | 1/2021 | Kim et al. |
| 2021/0084683 A1* | 3/2021 | Li .................. H04W 74/0808 |

(Continued)

FOREIGN PATENT DOCUMENTS

| | | |
|---|---|---|
| KR | 20200029358 A | 3/2020 |
| WO | 2020055075 A1 | 3/2020 |
| WO | 2020257645 A1 | 12/2020 |

*Primary Examiner* — Awet Haile
(74) *Attorney, Agent, or Firm* — Rabin & Berdo, P.C

(57) ABSTRACT

An operation method of a terminal in a communication system may comprise: receiving downlink control information (DCI) for scheduling uplink transmission from a base station; identifying a communication node initiating a channel occupancy time associated with the uplink transmission based on a channel access parameter included in the DCI; and performing the uplink transmission scheduled by the DCI within the channel occupancy time initiated by the communication node, wherein the communication node is the terminal or the base station.

18 Claims, 17 Drawing Sheets

(56) References Cited

U.S. PATENT DOCUMENTS

| | | |
|---|---|---|
| 2021/0099995 A1 | 4/2021 | Hwang |
| 2021/0195643 A1* | 6/2021 | Talarico ............ H04W 74/0816 |
| 2023/0146487 A1* | 5/2023 | Chien ................. H04W 74/006 |
| | | 370/329 |
| 2023/0354428 A1* | 11/2023 | Xu .................... H04W 74/0816 |

* cited by examiner

METHOD AND APPARATUS FOR CHANNEL ACCESS IN COMMUNICATION SYSTEM SUPPORTING UNLICENSED BAND

CROSS-REFERENCE TO RELATED APPLICATIONS

This application claims priority to Korean Patent Applications No. 10-2021-0035371 filed on Mar. 18, 2021, No. 10-2021-0092449 filed on Jul. 14, 2021, and No. 10-2022-0024174 filed on Feb. 24, 2022, with the Korean Intellectual Property Office (KIPO), the entire contents of which are hereby incorporated by reference.

BACKGROUND

1. Technical Field

The present disclosure relates to a channel access technique in a communication system, and more particularly, to a channel access technique for uplink transmission in an unlicensed band.

2. Related Art

With the development of information and communication technology, various wireless communication technologies have been developed. The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication system may support not only a frequency band below 6 GHz but also a 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

In the NR communication system, a terminal may perform uplink transmission in an unlicensed band. In order to perform uplink transmission in an unlicensed band, the terminal may perform the uplink transmission by using a channel occupancy time secured by a base station. Alternatively, the terminal may directly perform a channel access procedure. That is, the terminal may secure a channel occupancy time by performing the channel access procedure, and may perform uplink transmission within the channel occupancy time. Therefore, in order to secure a channel occupancy time for uplink transmission of the terminal, methods for performing a channel access procedure in an unlicensed band are required.

Meanwhile, the above-described technologies are described to enhance the understanding of the background of the present disclosure, and they may include non-prior arts that are not already known to those of ordinary skill in the art.

SUMMARY

Accordingly, exemplary embodiments of the present disclosure are directed to providing methods and apparatuses for channel access in a communication system supporting an unlicensed band.

According to a first exemplary embodiment of the present disclosure, an operation method of a terminal in a communication system may comprise: receiving downlink control information (DCI) for scheduling uplink transmission from a base station; identifying a communication node initiating a channel occupancy time associated with the uplink transmission based on a channel access parameter included in the DCI; and performing the uplink transmission scheduled by the DCI within the channel occupancy time initiated by the communication node, wherein the communication node is the terminal or the base station.

The performing of the uplink transmission may comprise performing the uplink transmission without performing a channel sensing operation when the channel occupancy time is initiated by the base station and a time gap between a previous uplink transmission of the terminal and the uplink transmission is less than a preset time.

The performing of the uplink transmission may comprise: performing a channel sensing operation when the channel occupancy time is initiated by the base station and a time gap between a previous uplink transmission of the terminal and the uplink transmission is equal to or greater than a preset time; and when a result of the channel sensing operation indicates an idle state, performing the uplink transmission.

The performing of the uplink transmission may comprise: performing a channel sensing operation when the channel occupancy time is initiated by the terminal and the uplink transmission occurs at a start time of a user equipment (UE)-fixed frame period configured by the terminal; and when a result of the channel sensing operation indicates an idle state, performing the uplink transmission.

The performing of the uplink transmission may comprise performing the uplink transmission without performing a channel sensing operation when the channel occupancy time is initiated by the terminal, the uplink transmission occurs after a start time of a UE-fixed frame period configured by the terminal, and a time gap between a previous uplink transmission of the terminal and the uplink transmission is less than a preset time.

The performing of the uplink transmission may comprise: performing a channel sensing operation when the channel occupancy time is initiated by the terminal, the uplink transmission occurs after a start time of a UE-fixed frame period configured by the terminal, and a time gap between a previous uplink transmission of the terminal and the uplink transmission is equal to or greater than a preset time.; and when a result of the channel sensing operation indicates an idle state, performing the uplink transmission.

The operation method may further comprise receiving, from the base station, a higher layer message indicating whether the DCI includes the channel access parameter.

The operation method may further comprise receiving, from the base station, a higher layer message including periodicity information and offset information, wherein the periodicity information indicates a periodicity of a channel occupancy time initiated by the terminal, and the offset information indicates an offset between a start time of an even-numbered radio frame and a start time of a first period of the channel occupancy time.

According to a second exemplary embodiment of the present disclosure, an operation method of a base station in a communication system may comprise: generating a channel access parameter indicating a communication node initiating a channel occupancy time associated with uplink transmission; transmitting downlink control information (DCI) including the channel access parameter and scheduling information of the uplink transmission to a terminal; and performing a reception operation for the uplink transmission scheduled by the DCI within the channel occupancy time initiated by the communication node, wherein the communication node is the terminal or the base station.

The uplink transmission may be expected to be performed without performing a channel sensing operation when the channel occupancy time is initiated by the base station and a time gap between a previous uplink transmission of the terminal and the uplink transmission is less than a preset time.

The uplink transmission may be expected to be performed according to a result of a channel sensing operation when the channel occupancy time is initiated by the base station and a time gap between a previous uplink transmission of the terminal and the uplink transmission is equal to or greater than a preset time.

The uplink transmission may be expected to be performed according to a result of a channel sensing operation when the channel occupancy time is initiated by the terminal and the uplink transmission occurs at a start time of a user equipment (UE)-fixed frame period configured by the terminal.

The uplink transmission may be expected to be performed without performing a channel sensing operation when the channel occupancy time is initiated by the terminal, the uplink transmission occurs after a start time of a user equipment (UE)-fixed frame period configured by the terminal, and a time gap between a previous uplink transmission of the terminal and the uplink transmission is less than a preset time.

The uplink transmission may be expected to be performed according to a result of a channel sensing operation when the channel occupancy time is initiated by the terminal, the uplink transmission occurs after a start time of a user equipment (UE)-fixed frame period configured by the terminal, and a time gap between a previous uplink transmission of the terminal and the uplink transmission is equal to or greater than a preset time.

The operation method may further comprise transmitting, to the terminal, a higher layer message indicating whether the DCI includes the channel access parameter.

The operation method may further comprise transmitting, to the terminal, a higher layer message including periodicity information and offset information, wherein the periodicity information indicates a periodicity of a channel occupancy time initiated by the terminal, and the offset information indicates an offset between a start time of an even-numbered radio frame and a start time of a first period of the channel occupancy time.

According to a third exemplary embodiment of the present disclosure, a terminal in a communication system may comprise: a processor; a memory electronically communicating with the processor; and instructions stored in the memory, wherein when executed by the processor, the instructions cause the terminal to: receive downlink control information (DCI) for scheduling uplink transmission from a base station; identify a communication node initiating a channel occupancy time associated with the uplink transmission based on a channel access parameter included in the DCI; and perform the uplink transmission scheduled by the DCI within the channel occupancy time initiated by the communication node, wherein the communication node is the terminal or the base station.

The instructions may further cause the terminal to receive, from the base station, a higher layer message indicating whether the DCI includes the channel access parameter.

In the performing of the uplink transmission, the instructions may further cause the terminal to perform the uplink transmission without performing a channel sensing operation when the channel occupancy time is initiated by the base station and a time gap between a previous uplink transmission of the terminal and the uplink transmission is less than a preset time.

In the performing of the uplink transmission, the instructions further cause the terminal to: perform a channel sensing operation when the channel occupancy time is initiated by the base station and the uplink transmission occurs at a start time of a user equipment (UE)-fixed frame period configured by the terminal; and perform the uplink transmission when a result of the channel sensing operation is determined to be an idle state.

According to the present disclosure, the terminal may perform periodic uplink transmission configured by an uplink message or uplink transmission scheduled by DCI. When the uplink transmission (e.g., periodic uplink transmission) is associated with a channel occupancy time initiated by the terminal, the terminal may perform the uplink transmission (e.g., periodic uplink transmission) within the channel occupancy time of the terminal based on preset condition(s). When the uplink transmission (e.g., periodic uplink transmission) is associated with a channel occupancy time initiated by the base station, the terminal may perform the uplink transmission (e.g., periodic uplink transmission) within the channel occupancy time of the base station based on preset condition(s). Accordingly, the efficiency of the channel access procedure for uplink transmission can be improved, and the performance of the communication system can be improved.

DETAILED DESCRIPTION OF THE EMBODIMENTS

Figure 1:
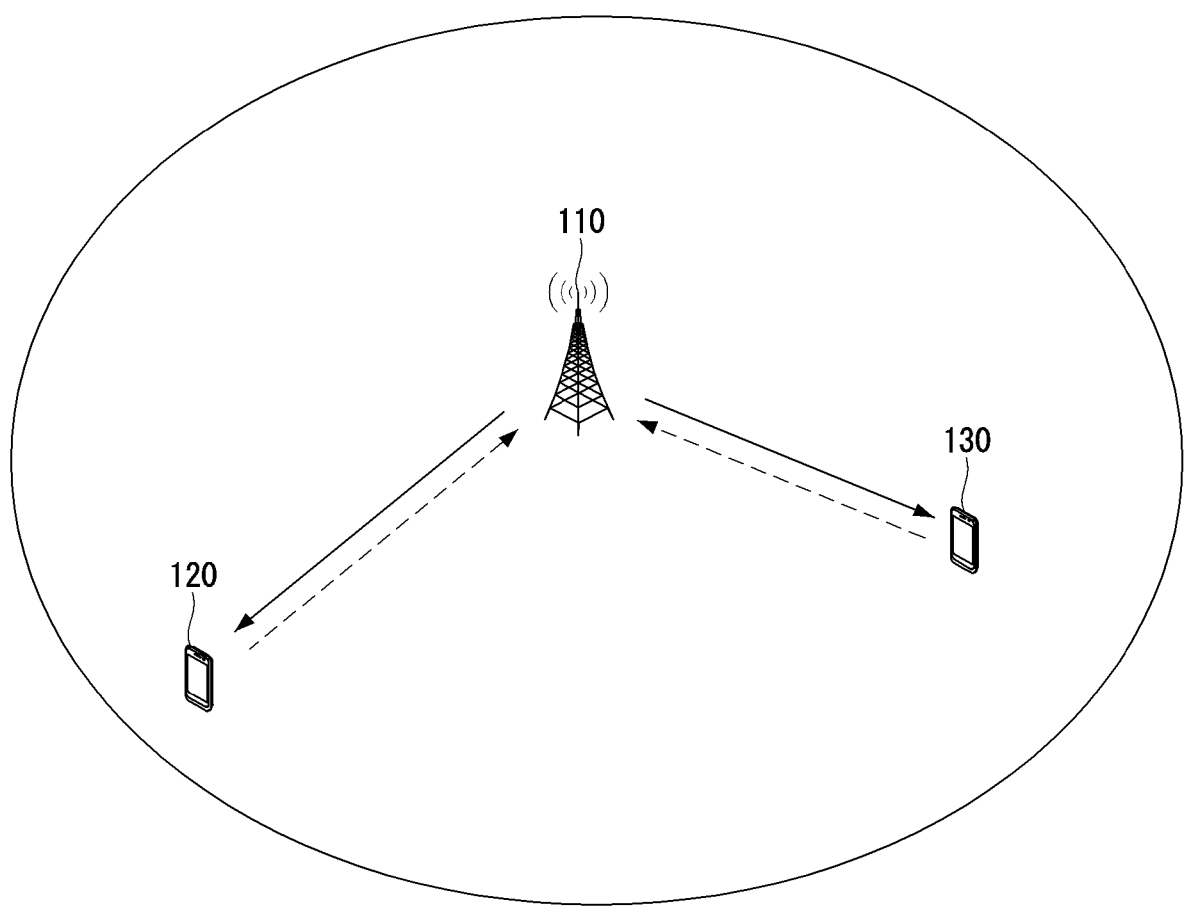
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may mean "transmission", "retransmission", or "transmission and retransmission", "(re)configuration" may mean "configuration", "reconfiguration", or "configuration and reconfiguration", "(re)connection" may mean "connection", "reconnection", or "connection and reconnection", and "(re)access" may mean "access", "re-access", or "access and re-access".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)).

FIG. 1 is a conceptual diagram illustrating a first exemplary embodiment of a communication system.

Referring to FIG. 1, a base station 110 may support cellular communication (e.g., long term evolution (LTE), LTE-advance (LTE-A), LTE-A Pro, LTE-unlicensed (LTE- U), new radio (NR), and NR-unlicensed (NR-U) specified in the 3$^{rd}$ generation partnership project (3GPP) specifications), or the like. The base station 110 may support multiple-input multiple-output (MIMO) (e.g., single-user MIMO (SU-MIMO), multi-user MIMO (MU-MIMO), massive MIMO, etc.), coordinated multipoint (CoMP), carrier aggregation (CA), or the like. The base station 110 may transmit a downlink channel and/or signal to a first terminal 120. The first terminal 120 may receive the downlink channel and/or signal from the base station 110. The first terminal 120 may transmit an uplink channel and/or signal to the base station 110. The base station 110 may receive the uplink channel and/or signal from the first terminal 120.

The communication node (i.e., base station, terminal, etc.) constituting the communication network described above may support a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, evolved Node B, 5G Node B (gNodeB), base transceiver station (BTS), radio base station, radio transceiver, access point, access node, transmission/reception point (Tx/Rx Point), or the like. Among the communication nodes, the terminal may be referred to as a user equipment (UE), access terminal, mobile terminal, station, subscriber station, portable subscriber station, mobile station, node, device, or the like. The communication node may have the following structure.

Figure 2:
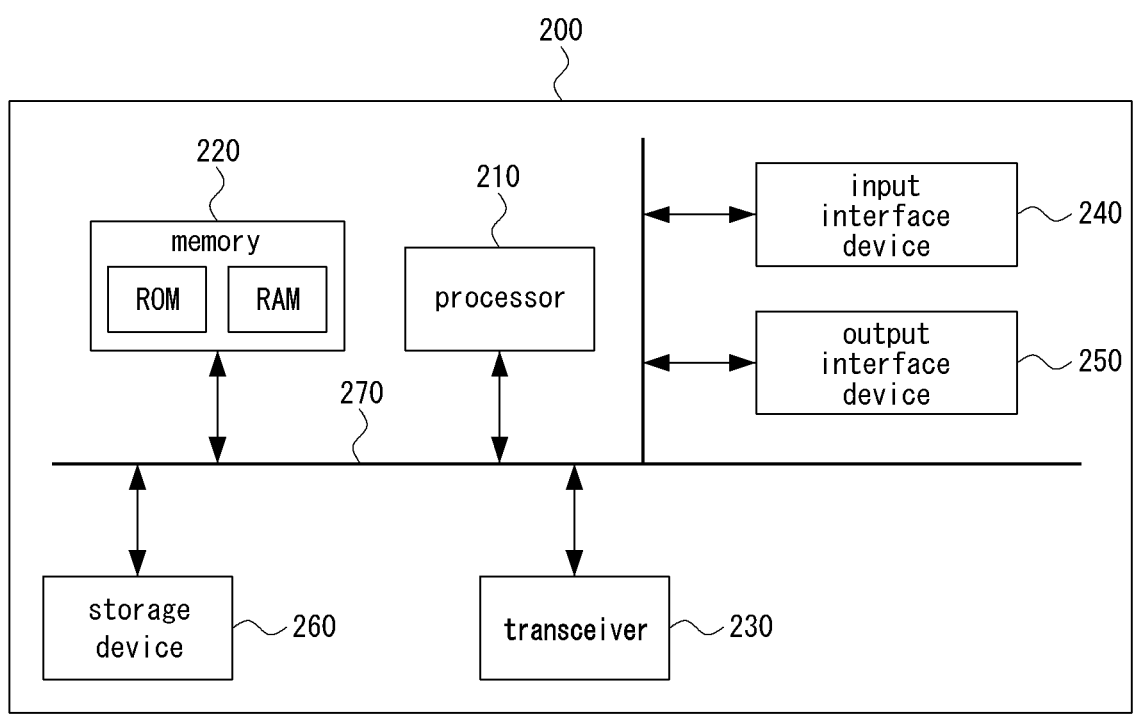
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of a communication node in a communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
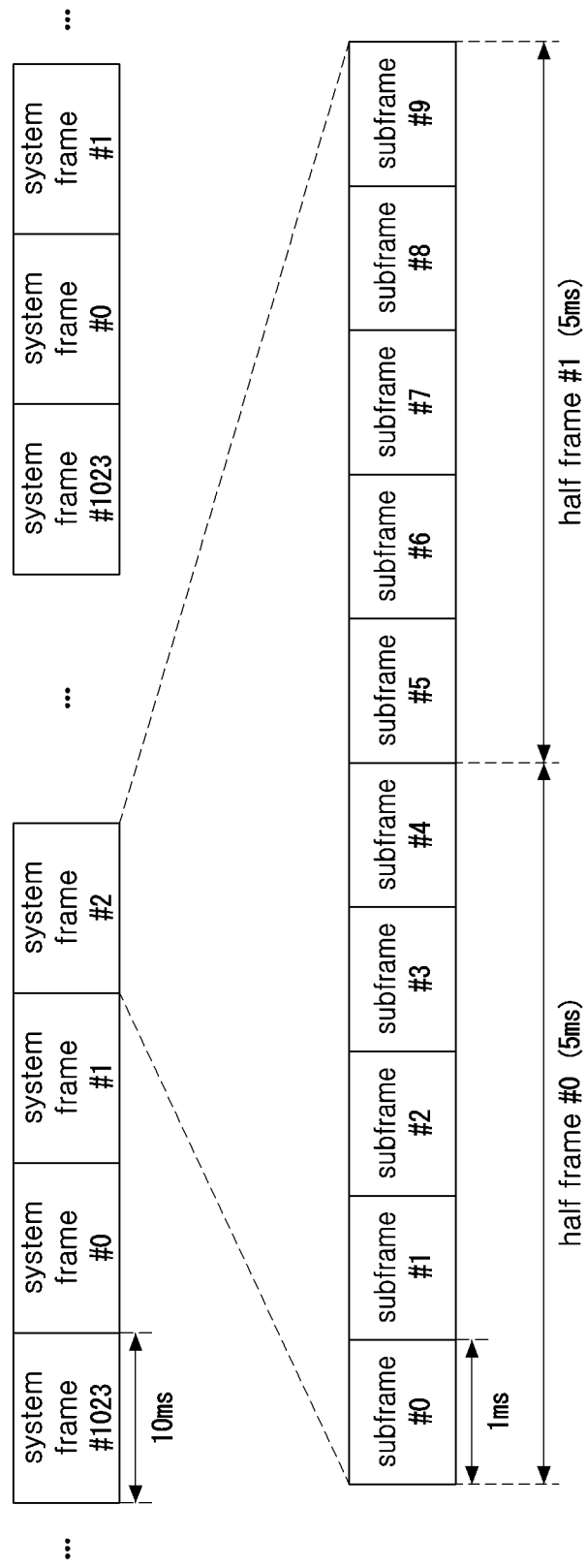
FIG. 3 is a conceptual diagram illustrating a first exemplary embodiment of a system frame in a communication system.

FIG. 3 is a conceptual diagram illustrating a first exemplary embodiment of a system frame in a communication system.

Referring to FIG. 3, time resources in a communication network may be divided into frames. For example, system frames each of which has a length of 10 milliseconds (ms) may be configured consecutively in the time domain of the communication system. System frame numbers (SFNs) may be set to #0 to #1023. In this case, 1024 system frames may be repeated in the time domain of the communication system. For example, an SFN of a system frame after the system frame #1023 may be set to #0.

One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
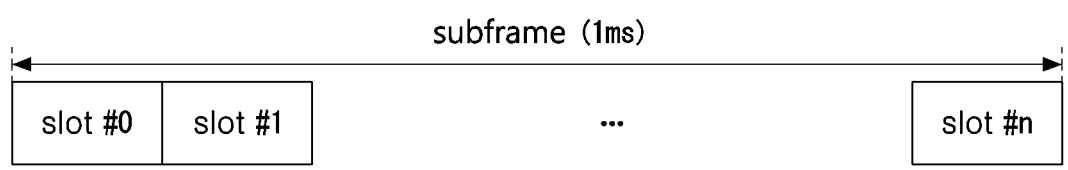
FIG. 4 is a conceptual diagram illustrating a first exemplary embodiment of a subframe in a communication system.

FIG. 4 is a conceptual diagram illustrating a first exemplary embodiment of a subframe in a communication system.

Referring to FIG. 4, one subframe may include n slots, and n may be a natural number. Accordingly, one subframe may be composed of one or more slots.

Figure 5:
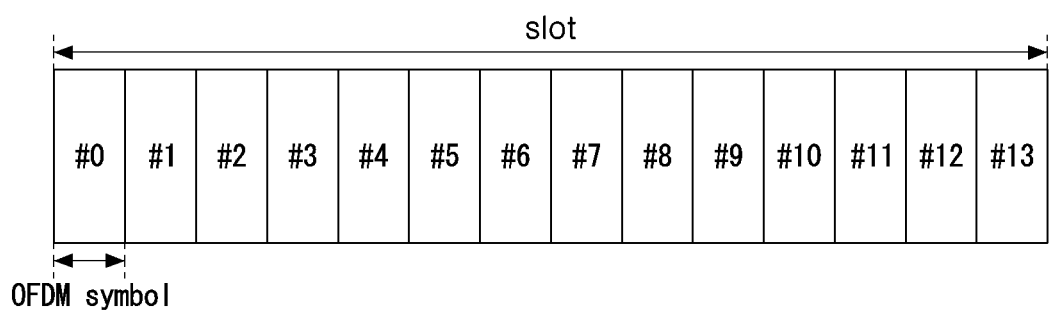
FIG. 5 is a conceptual diagram illustrating a first exemplary embodiment of a slot in a communication system.

FIG. 5 is a conceptual diagram illustrating a first exemplary embodiment of a slot in a communication system.

Referring to FIG. 5, one slot may comprise one or more symbols. One slot shown in FIG. 5 may be composed of 14 symbols. Here, the length of the slot may vary depending on the number of symbols included in the slot and the length of the symbol. Alternatively, the length of the slot may vary according to a numerology. When a subcarrier spacing is 15 kHz (e.g., µ=0), the length of the slot may be 1 ms. In this case, one system frame may include 10 slots. When the subcarrier spacing is 30 kHz (e.g., µ=1), the length of the slot may be 0.5 ms.

In this case, one system frame may include 20 slots.

When the subcarrier spacing is 60 kHz (e.g., µ=2), the length of the slot may be 0.25 ms. In this case, one system frame may include 40 slots. When the subcarrier spacing is 120 kHz (e.g., µ=3), the length of the slot may be 0.125 ms. In this case, one system frame may include 80 slots. When the subcarrier spacing is 240 kHz (e.g., µ=4), the length of the slot may be 0.0625 ms. In this case, one system frame may include 160 slots.

The symbol may be configured as a downlink (DL) symbol, a flexible symbol, or an uplink (UL) symbol. A slot composed only of DL symbols may be referred to as 'DL slot', a slot composed only of FL symbols may be referred to as 'FL slot', and a slot composed only of UL symbols may be referred to as 'UL slot'.

A reference signal may be a channel state information-reference signal (CSI-RS), a sounding reference signal (SRS), a demodulation-reference signal (DM-RS), a phase tracking-reference signal (PT-RS), or the like. A channel may be a physical downlink control channel (PDCCH), a physical downlink shared channel (PDSCH), a physical uplink control channel (PUCCH), a physical uplink shared channel (PUSCH), a physical sidelink control channel (PSCCH), a physical sidelink shared channel (PSSCH), or the like. In exemplary embodiments below, a control channel may refer to a PDCCH, PUCCH, or PSCCH, and a data channel may refer to a PDSCH, PUSCH, or PSSCH.

Figure 6:
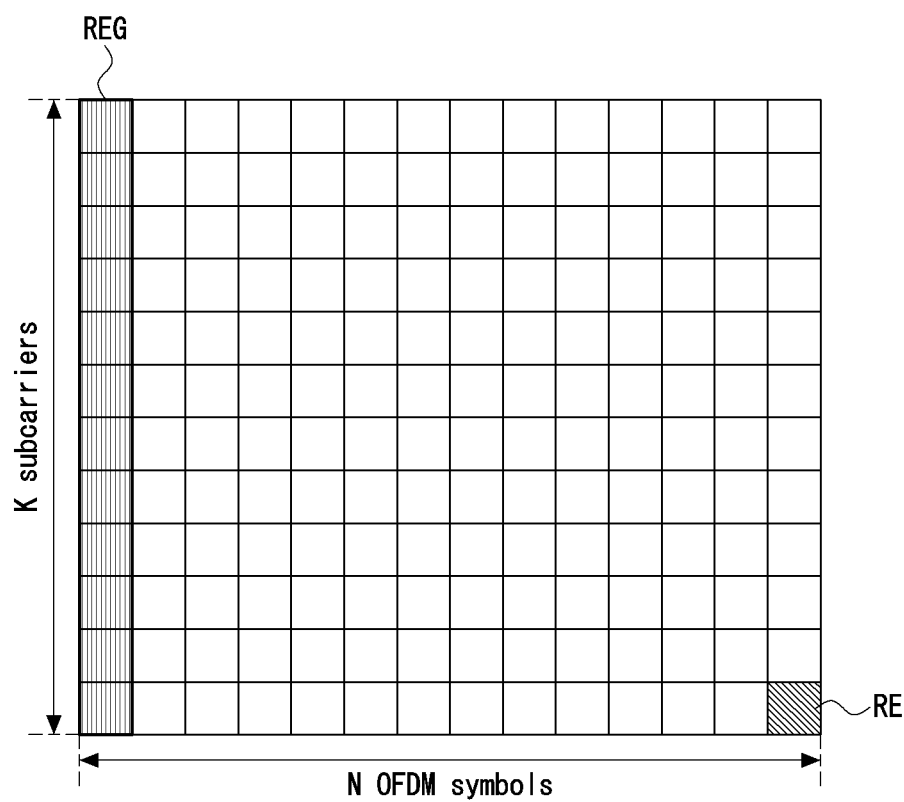
FIG. 6 is a conceptual diagram illustrating a first exemplary embodiment of time-frequency resources in a communication system.

FIG. 6 is a conceptual diagram illustrating a first exemplary embodiment of time-frequency resources in a communication system.

Referring to FIG. 6, a resource configured with one OFDM symbol in the time domain and one subcarrier in the frequency domain may be defined as a 'resource element (RE)'. Resources configured with one OFDM symbol in the time domain and K subcarriers in the frequency domain may be defined as a 'resource element group (REG)'. One REG may include K REs. The REG may be used as a basic unit of resource allocation in the frequency domain. K may be a natural number. For example, K may be 12. N may be a natural number. N in the slot shown in FIG. 5 may be 14, and N in the slot shown in FIG. 6 may be 7. The N OFDM symbols may be used as a basic unit of resource allocation in the time domain.

Downlink data may be transmitted on a physical downlink shared channel (PDSCH). The base station may transmit configuration information of the PDSCH to the terminal on a physical downlink control channel (PDCCH). The terminal may obtain the configuration information (e.g., scheduling information) of the PDSCH by receiving the PDCCH (e.g., downlink control information (DCI)). For example, the configuration information of the PDSCH may include a modulation and coding scheme (MCS) used for transmission and reception of the PDSCH, time resource information of the PDSCH, frequency resource information of the PDSCH, feedback resource information of the PDSCH, and/or the like. The PDSCH may refer to a radio resource through which the downlink data is transmitted and received. Alternatively, the PDSCH may refer to the downlink data itself. The PDCCH may refer to a radio resource through which the downlink control information (e.g., DCI) is transmitted and received. Alternatively, the PDCCH may refer to the downlink control information itself.

Figure 7:
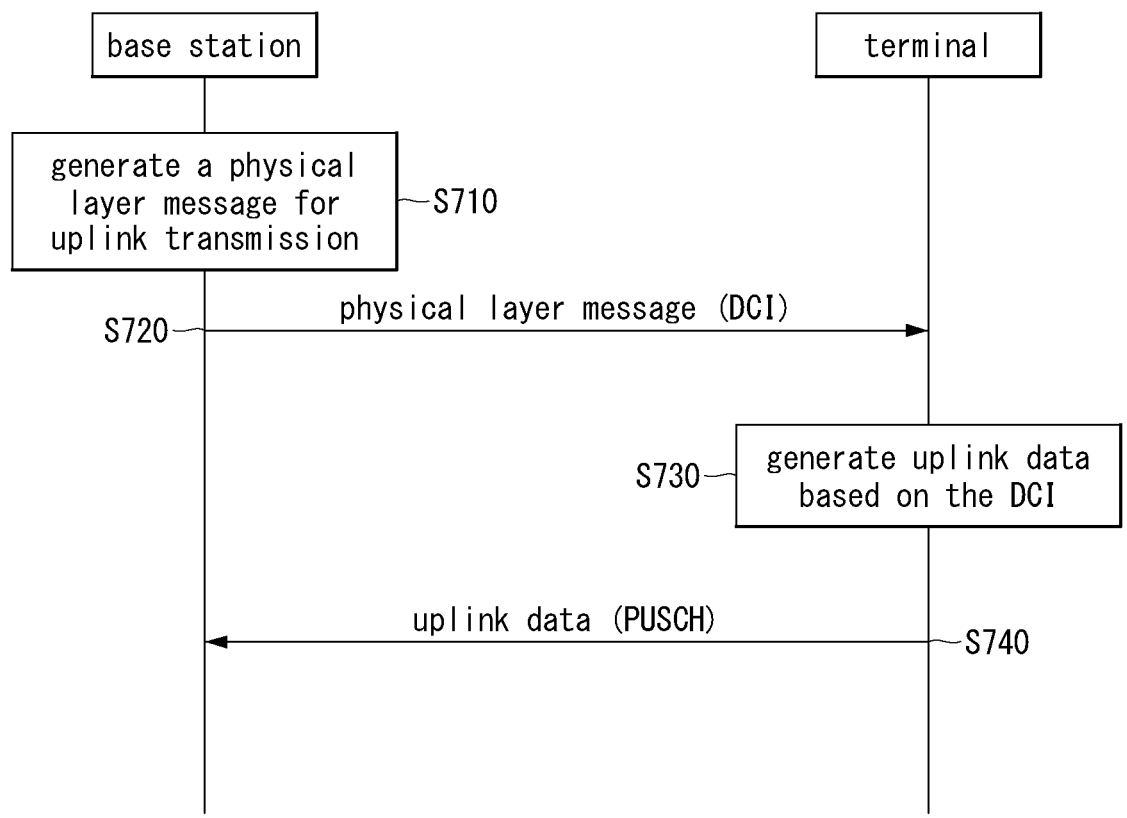
FIG. 7 is a sequence chart illustrating a first exemplary embodiment of an uplink communication method using a physical layer message in a communication system.

FIG. 7 is a sequence chart illustrating a first exemplary embodiment of an uplink communication method using a physical layer message in a communication system.

Referring to FIG. 7, a base station may generate a physical layer message for uplink transmission (S710). The physical layer message may include DCI. The physical layer message for uplink transmission may be referred to as uplink (UL) DCI. The physical layer message may include time domain resource assignment information, frequency domain resource assignment information, and modulation and coding scheme (MCS) information for uplink transmission. The base station may transmit the physical layer message for uplink transmission (S720). The physical layer message may be transmitted on a PDCCH.

The terminal may receive the physical layer message (e.g., DCI) for uplink transmission from the base station. For example, the terminal may receive the physical layer message by performing a monitoring operation on the PDCCH. The terminal may generate uplink data based on information (e.g., information elements) included in the physical layer message (S730). The terminal may transmit the uplink data to the base station on a PUSCH indicated by the information included in the physical layer message (S740). The base station may receive the uplink data from the terminal on the PUSCH.

Figure 8:
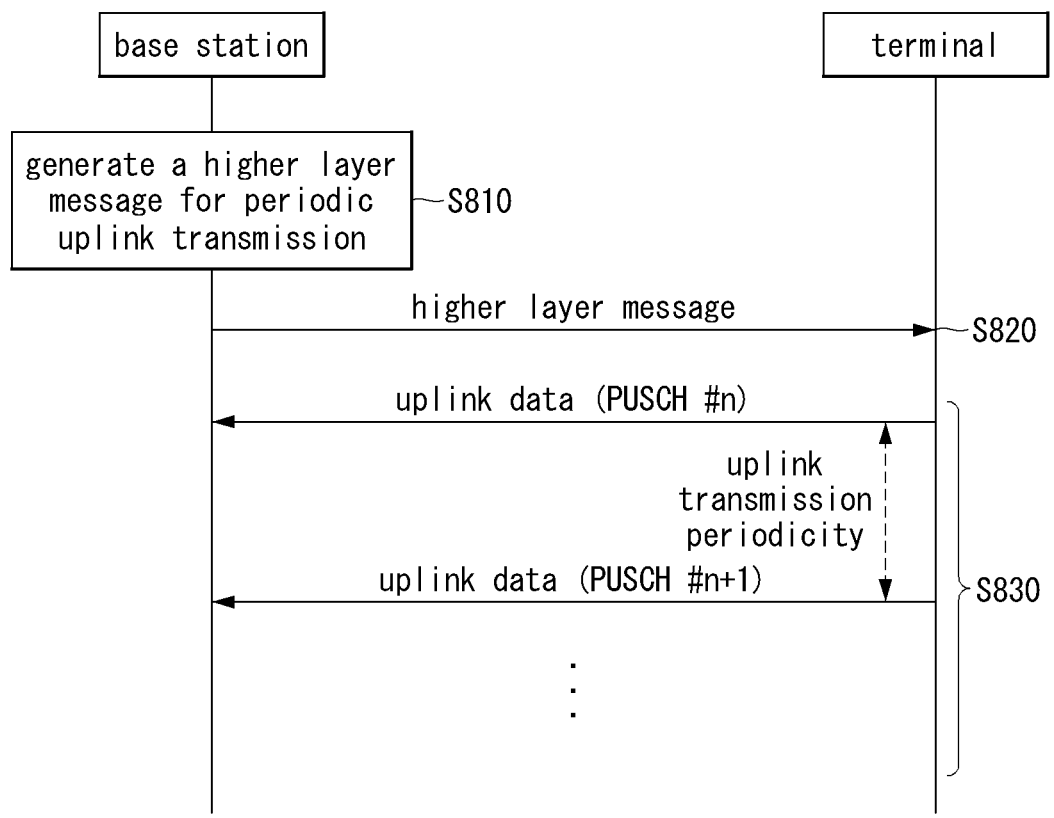
FIG. 8 is a sequence chart illustrating a first exemplary embodiment of an uplink communication method using a higher layer message in a communication system.

FIG. 8 is a sequence chart illustrating a first exemplary embodiment of an uplink communication method using a higher layer message in a communication system.

Referring to FIG. 8, a base station may generate a higher layer message for periodic uplink transmission (S810). The periodic uplink transmission may be referred to as 'configured uplink transmission'. The higher layer message may include radio resource control (RRC) configuration information. The higher layer message may be referred to as 'RRC message'. The higher layer message may include configuration information for periodic uplink transmission (e.g., configured grant (CG) configuration information). For example, the CG configuration information may include at least one of time resource information, frequency resource information, MCS information, an uplink transmission periodicity, or a time offset of the uplink transmission periodicity. The base station may transmit the higher layer message for periodic uplink transmission (S820).

The terminal may receive the higher layer message for periodic uplink transmission from the base station, and may identify the configuration information (e.g., CG configuration information) for periodic uplink transmission included in the higher layer message. The terminal may identify PUSCH(s) based on the CG configuration information. The PUSCH(s) (e.g., PUSCH #n, PUSCH #n+1, etc.) may be periodically configured in the time domain. n may be an integer greater than or equal to 0. The terminal may periodically transmit uplink data on the PUSCH(s) to the base station (S830). The base station may receive the uplink data (e.g., periodic uplink data) from the terminal on the PUSCH (s).

Figure 9:
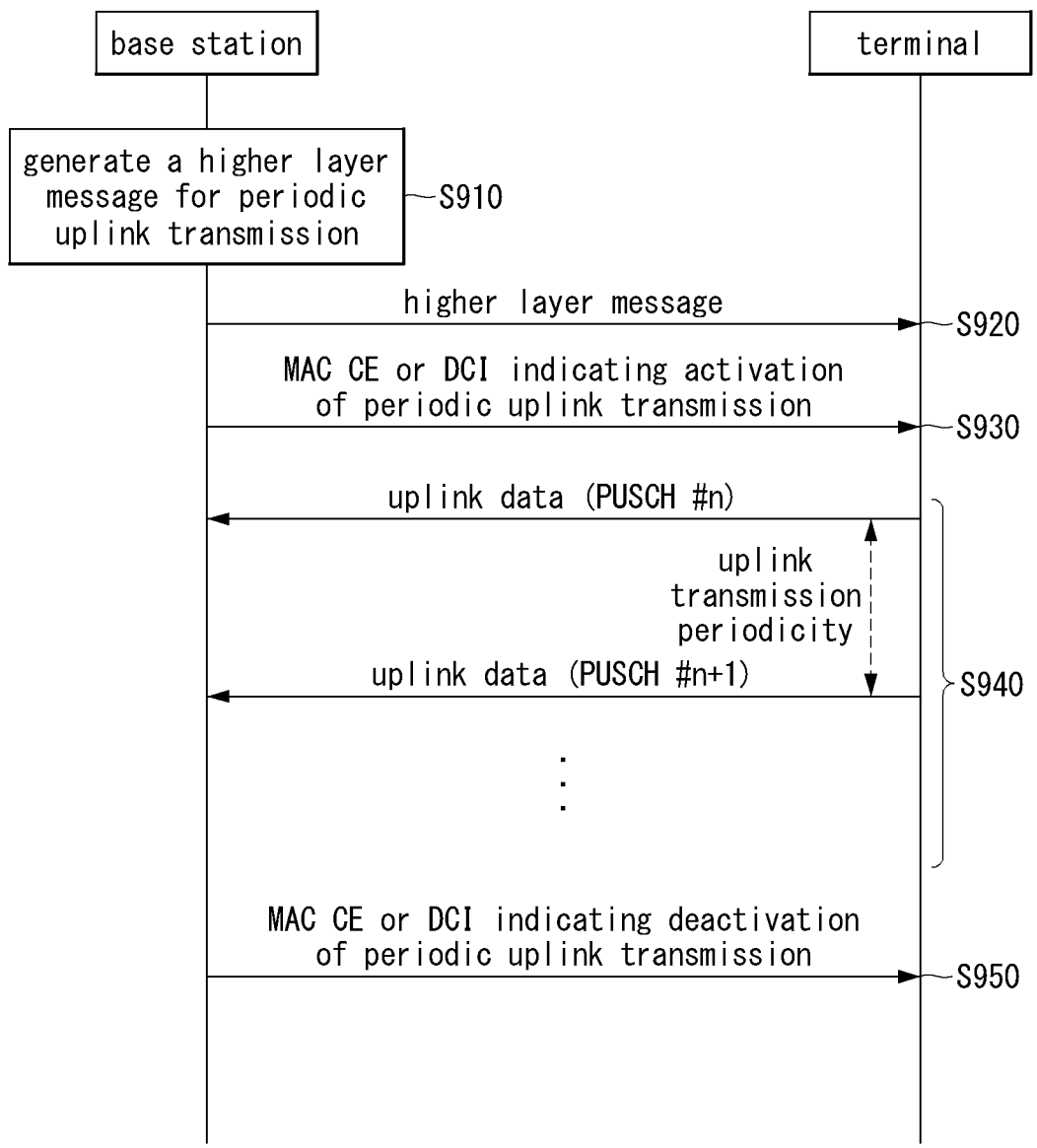
FIG. 9 is a sequence chart illustrating a second exemplary embodiment of an uplink communication method using a higher layer message in a communication system.

FIG. 9 is a sequence chart illustrating a second exemplary embodiment of an uplink communication method using a higher layer message in a communication system.

Referring to FIG. 9, a base station may generate a higher layer message for periodic uplink transmission (S910). The higher layer message may include RRC configuration information. The higher layer message may include configuration information (e.g., CG configuration information) for periodic uplink transmission. For example, the CG configuration information may include at least one of time resource information, frequency resource information, MCS information, an uplink transmission periodicity, or a time offset of the uplink transmission periodicity. The base station may transmit the higher layer message for periodic uplink transmission (S920).

The terminal may receive the higher layer message for periodic uplink transmission from the base station, and may identify the configuration information (e.g., CG configuration information) for periodic uplink transmission included in the higher layer message. The terminal may identify PUSCH(s) based on the CG configuration information. The PUSCH(s) (e.g., PUSCH #n, PUSCH #n+1, etc.) may be periodically configured in the time domain. The periodic uplink transmission may be configured by the higher layer message. Activation or deactivation of the periodic uplink transmission may be indicated by a medium access control (MAC) control element (CE) or a physical layer message (e.g., DCI).

When desiring to activate the periodic uplink transmission, the base station may transmit a MAC CE or physical layer message indicating activation of the periodic uplink transmission (S930). When the MAC CE or physical layer message indicating activation of the periodic uplink transmission is received from the base station, the terminal may periodically transmit uplink data to the base station on the PUSCH(s) configured by the higher layer message (S940). The base station may receive the uplink data (e.g., periodic uplink data) from the terminal on the PUSCH(s).

When desiring to deactivate the periodic uplink transmission, the base station may transmit a MAC CE or physical layer message indicating deactivation of the periodic uplink transmission (S950). When the MAC CE or physical layer message indicating deactivation of the periodic uplink transmission is received from the base station, the terminal may stop the periodic uplink transmission.

Figure 10:
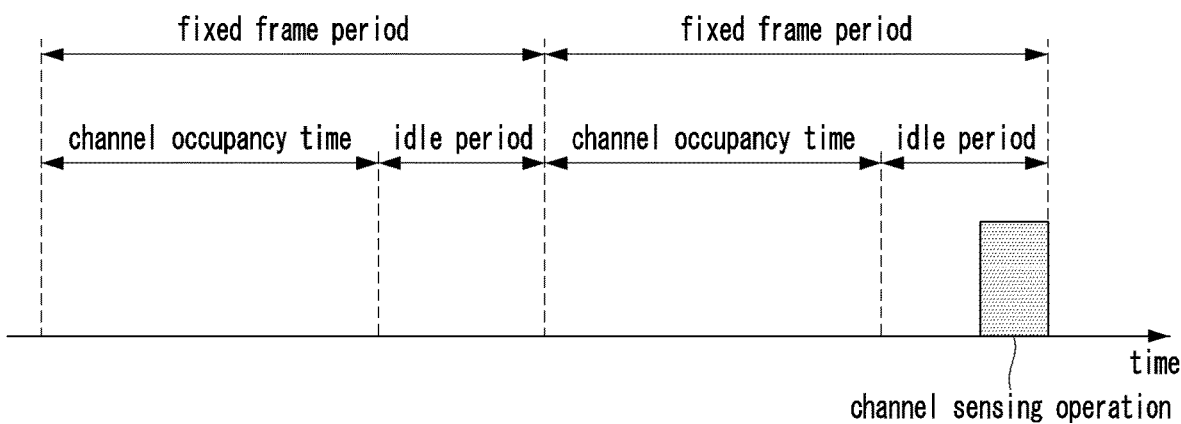
FIG. 10 is a conceptual diagram illustrating a first exemplary embodiment of a channel access method of a communication system supporting an unlicensed band.

FIG. 10 is a conceptual diagram illustrating a first exemplary embodiment of a channel access method of a communication system supporting an unlicensed band.

Referring to FIG. 10, a communication node (e.g., base station or terminal) may periodically attempt channel access. A period in which channel access is attempted may be referred to as 'fixed frame period'. The fixed frame period may be referred also to as 'period of duration'. A fixed frame period for a base station may be referred to as 'base station (BS)-fixed frame period' or 'BS-period of duration', and a fixed frame period for a terminal may be referred to as 'user-equipment (UE)-fixed frame period' or 'UE-period of duration'. A channel occupancy time (COT) may exist within a fixed frame period (e.g., period of duration). The channel occupancy time may be referred to as 'channel occupancy period' or 'channel occupancy'. A communication node may transmit/receive a channel and/or a signal in the channel occupancy time. An idle period may exist within a fixed frame period. In the idle period, transmission/reception of a channel and/or a signal may not be performed. A channel access procedure (e.g., channel sensing operation) for securing a channel occupancy time within the next fixed frame period may be performed within the idle period.

A ratio of a channel occupancy time within a fixed frame period may be maintained below a preset ratio. For example, a ratio of a channel occupancy time within a fixed frame period $$\left(\text{e.g., } \frac{\text{channel occupancy time}}{\text{fixed frame period}} \times 100\right)$$

may be maintained at 95% or less. A ratio of an idle period within a fixed frame period may be maintained above a preset ratio. For example, a ratio of an idle period within a fixed frame period $$\left(\text{i.e., } \frac{\text{idle period}}{\text{fixed frame period}} \times 100\right)$$

may be maintained at 5% or more. A length of an idle period within a fixed frame period may be set to be longer than a specific time. For example, a length of an idle period within a fixed frame period may be set to at least 100 us.

Figure 11:
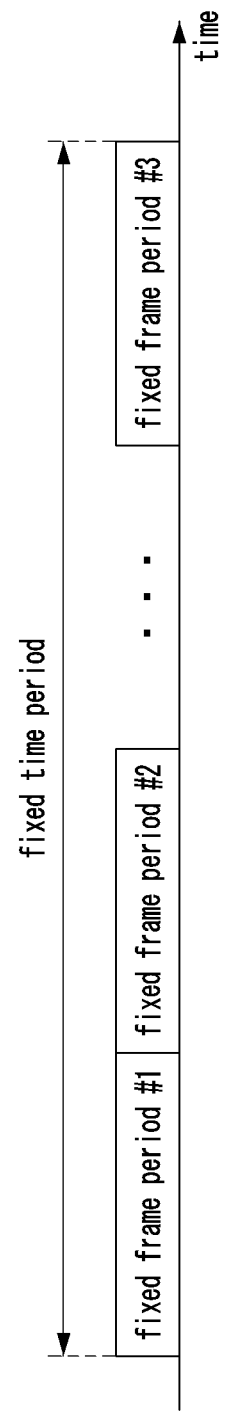
FIG. 11 is a conceptual diagram illustrating a first exemplary embodiment of a method for configuring a fixed frame period within a fixed time period.

FIG. 11 is a conceptual diagram illustrating a first exemplary embodiment of a method for configuring a fixed frame period within a fixed time period.

Referring to FIG. 11, a fixed frame period may be repeated within a fixed time period. The fixed time period may be a preset time period. For example, the length of the fixed time period may be 20 milliseconds (ms). When the length of the fixed time period is x ms and the fixed frame period is y ms, the fixed frame period may be repeated (x/y) times within the fixed time period. Each of x and y may be a natural number. For example, when x is 20 and y is 5, the fixed frame period may be repeated four times within the fixed time period. In this case, start positions of the fixed frame periods may be 0, x, 2x, . . . , and ((x−y)−1)x ms apart from a start position of the fixed time period, respectively.

The start position of the fixed time period may be predefined. For example, the start position of the fixed time period may be the same as the start position of every frame or every subframe. As another example, the start position of the fixed time period may be an even-numbered radio frame or an even-numbered subframe. As another example, the start position of the fixed time period may be an odd-numbered radio frame or an odd-numbered subframe. The fixed time period may be repeated at each of the above-described start positions.

The start position of the fixed frame period may vary according to configuration of the base station. The base station may configure the fixed frame period and may inform the terminal of configuration information of the fixed frame period. Configuration information of the BS-fixed frame period (e.g., SemiStaticChannelAccessConfig) and configuration information of the UE-fixed frame period (e.g., ue-SemiStaticChannelAccessConfig) may be independently configured. The base station may inform the terminal of the configuration information of the BS-fixed frame period and the configuration information of the UE-fixed frame period, respectively.

The configuration information of the fixed frame period may include the length of the fixed frame period and/or the start position of the fixed frame period. The configuration information of the fixed frame period may be transmitted to the terminal through a higher layer message (e.g., RRC message). The terminal may receive the higher layer message including the configuration information of the fixed frame period from the base station and may identify the start positions of the fixed frame periods based on the configuration information.

A channel sensing operation (e.g., channel access procedure) may be performed before the start position of the fixed frame period. The channel sensing operation may be performed to determine whether a corresponding channel is used by another communication system and/or another terminal. The channel sensing operation may be performed based on an energy detection scheme or a signal detection scheme. The channel sensing operation may be performed for more than a preset time within a specific period (e.g., fixed period). The specific period may be one of 5 us, 9 us, 16 us, or 25 us, and the preset time during which the channel sensing operation is performed within the specific period may be one of 4 us, 5 us, 9 us, or 16 us.

When it is determined that the corresponding channel is not used by another communication system and/or another communication node based on a result of the channel sensing operation, the communication node may secure a channel occupancy time in the corresponding channel. 'Securing a channel occupancy time' may mean 'initiating the channel occupancy time'. The channel occupancy time may be configured within a fixed frame period immediately after the channel sensing operation is performed. For example, the communication node may perform the channel sensing operation in the idle period of the fixed frame period #n before the fixed frame period #n+1. When the corresponding channel is determined to be in an idle state by the channel sensing operation, the communication node may secure the channel occupancy time within the fixed frame period #n+1 after the fixed frame period #n in which the channel sensing operation is performed. The idle state may mean a state in which the corresponding channel is available. The communication node may perform a transmission/reception operation of a channel and/or a signal by using the secured channel occupancy time. The channel and/or signal transmission operation using the channel occupancy time may be terminated before the idle period.

The base station may inform the terminal of the configuration information of the fixed frame period. The configuration information of the fixed frame period may be transmitted through a higher layer message (e.g., RRC message). The configuration information of the fixed frame period may include at least one of fixed frame period information, channel occupancy time information, idle period information, an offset, or a combination thereof. The information included in the configuration information of the fixed frame period may be indicated in units of time or symbols. For example, the fixed frame period may be indicated in milliseconds (ms).

The terminal may receive the higher layer message (e.g., RRC message) including the configuration information of the fixed frame period from the base station, and may identify the information included in the configuration information of the fixed frame period.

Figure 12:
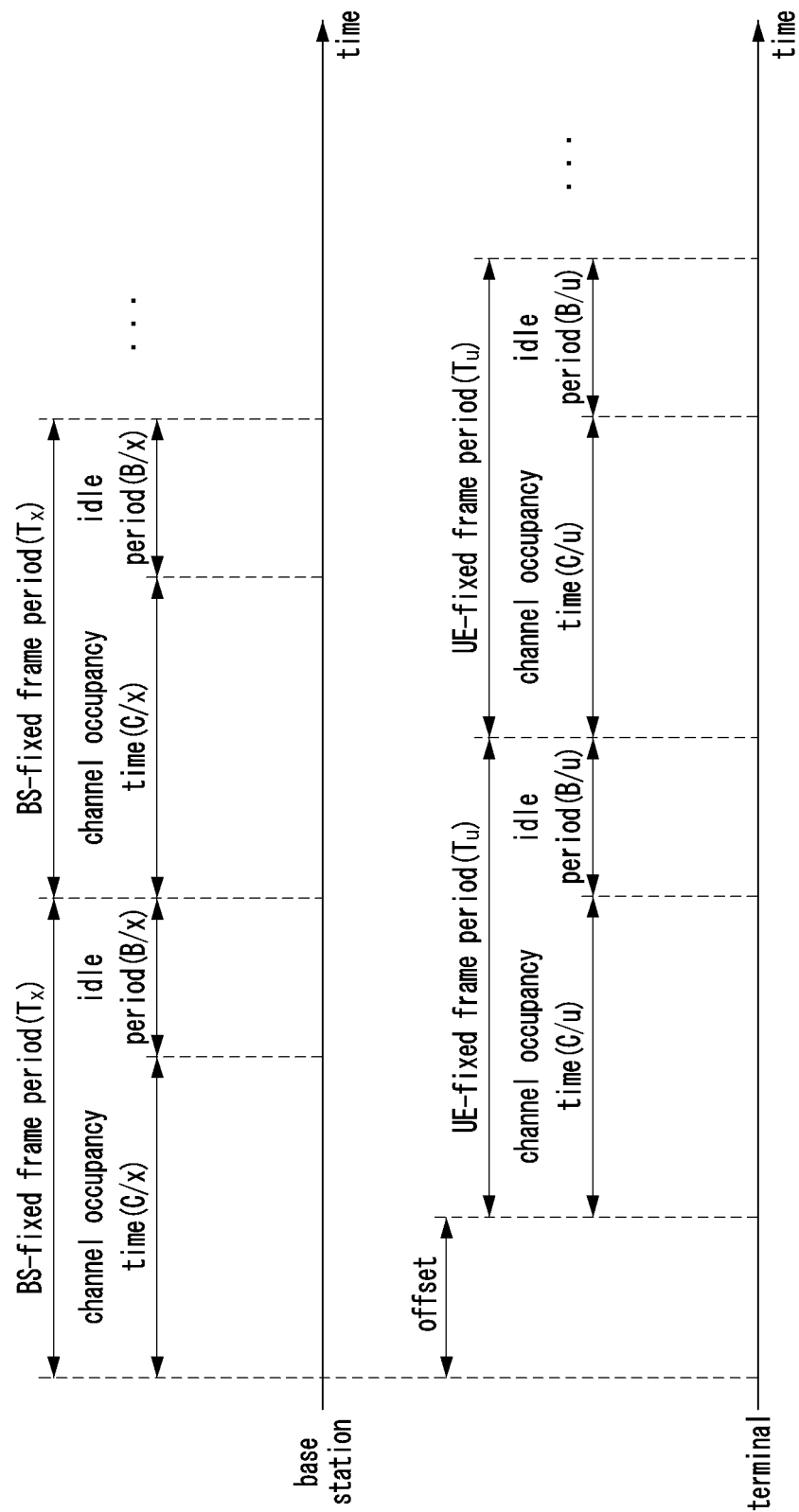
FIG. 12 is a conceptual diagram illustrating a second exemplary embodiment of a channel access method of a communication system supporting an unlicensed band.

FIG. 12 is a conceptual diagram illustrating a second exemplary embodiment of a channel access method of a communication system supporting an unlicensed band.

Referring to FIG. 12, a base station may transmit configuration information of a UE-fixed frame period $T_u$ for a terminal to the terminal. The terminal may receive the configuration information of the UE-fixed frame period $T_u$ from the base station. The configuration information of the UE-fixed frame period $T_u$ may include at least one of UE-fixed frame period $T_u$ information, channel occupancy time $C_u$ information, idle period $B_u$ information, or an offset. The configuration information of the UE-fixed frame period $T_u$ may be configured independently of configuration information of a BS-fixed frame period $T_x$ for the base station.

The role of each of the UE-fixed frame period $T_u$, channel occupancy time $C_u$, and idle period $B_u$ in the configuration information of the UE-fixed frame period $T_u$ may be the same as or similar to the role of each of BS-fixed frame period $T_x$, channel occupancy time $C_x$, and idle period $B_x$ for the base station. The offset in the configuration information of the UE-fixed frame period $T_u$ may be a time offset between a specific time point and a start time of a fixed time period of the terminal. The offset in the configuration information of the UE-fixed frame period $T_u$ may be a time offset from a specific time point to a start time of a first UE-fixed frame period $T_u$ for the terminal. The above-described specific time point may be a start time of a fixed time period of the base station. Alternatively, the specific time point may be a start time point of a radio frame, a start time point of an odd-numbered radio frame, or a start time point of an even-numbered radio frame.

The configuration information of the UE-fixed frame period $T_u$ may be indicated and/or configured based on time units. For example, each of the UE-fixed frame period $T_u$ and the offset may be indicated and/or configured in units of milliseconds (ms). The configuration information of the UE-fixed frame period $T_u$ may be indicated and/or configured based on time units defined in a communication system. For example, each of the UE-fixed frame period $T_u$ and the offset may be indicated and/or configured in units of subframes, slots, or symbols (e.g., OFDM symbols). When each of the UE-fixed frame period $T_u$ and the offset is indicated in units of slots or symbols, the length of each of the UE-fixed frame period $T_u$ and the offset may vary according to a subcarrier spacing. A reference subcarrier spacing for indicating the length of each of the UE-fixed frame period $T_u$ and the offset may be the smallest subcarrier spacing among subcarrier spacings configured for a corresponding cell. The maximum length of the time period indicated by the offset may be indicated and/or configured to be shorter than that of the fixed frame period (e.g., UE-fixed frame period $T_u$).

The base station may inform the terminal of the configuration information of the UE-fixed frame period $T_u$ through a higher layer message (e.g., RRC message). The terminal may receive the configuration information of the UE-fixed frame period $T_u$ from the base station through the higher layer message. The terminal may attempt to receive the configuration information of the UE-fixed frame period $T_u$ based on RRC configuration. The terminal may attempt channel access by using the configuration information of the UE-fixed frame period $T_u$. When the configuration information of the UE-fixed frame period $T_u$ is not indicated by the base station, the terminal may perform a channel access procedure based on the configuration information of the BS-fixed frame period $T_x$.

Figure 13:
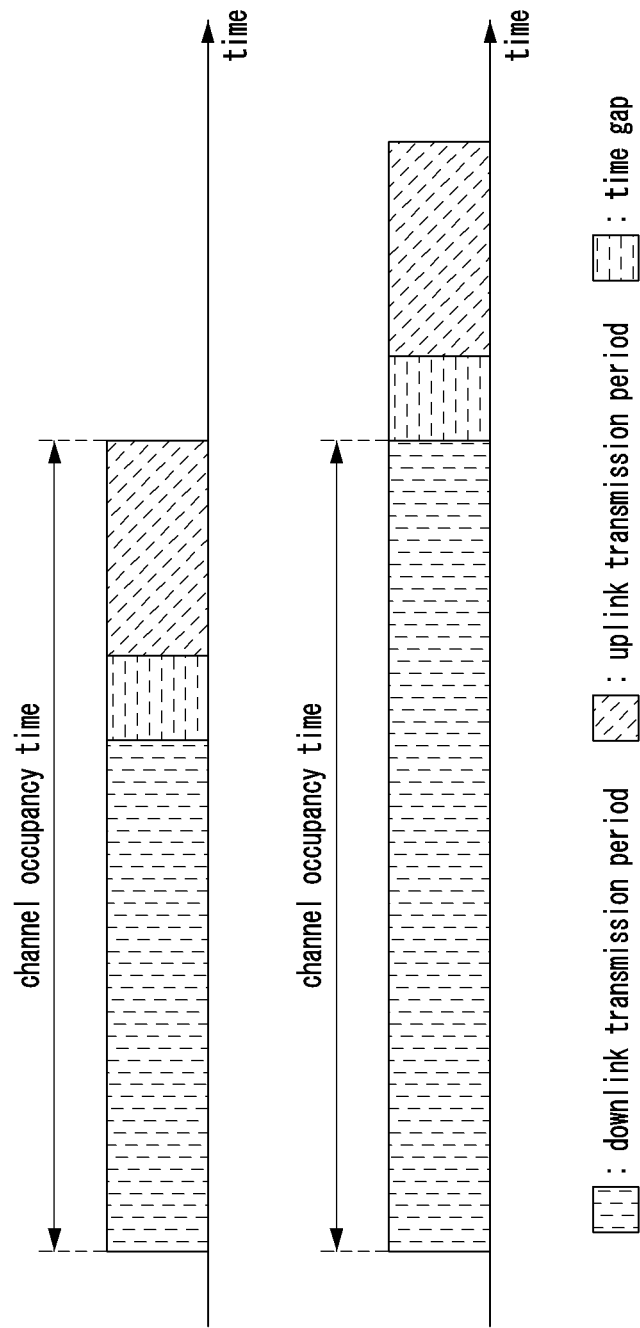
FIG. 13 is a conceptual diagram illustrating a first exemplary embodiment of a method for transmitting and receiving a channel and/or a signal within a channel occupancy time in a communication system supporting an unlicensed band.

FIG. 13 is a conceptual diagram illustrating a first exemplary embodiment of a method for transmitting and receiving a channel and/or a signal within a channel occupancy time in a communication system supporting an unlicensed band.

Referring to FIG. 13, a base station may secure a channel occupancy time by performing a channel access procedure. The base station may perform downlink transmission within the channel occupancy time. The downlink transmission may be performed within the channel occupancy time. After the downlink transmission of the base station, a terminal may perform uplink transmission. A time interval from an end time of the downlink transmission of the base station to a start time of the uplink transmission of the terminal may be referred to as 'time gap'. The channel access procedure for uplink transmission of the terminal may vary according to the length of the time gap.

When an uplink transmission period of the terminal exists within the channel occupancy time and the length of the time gap is less than or equal to a specific time, the terminal may perform the uplink transmission without performing a channel sensing operation. The specific time may be 16 us. When the length of the time gap exceeds the specific time, the terminal may perform a channel sensing operation for the uplink transmission. The terminal may perform the channel sensing operation for more than a preset time to perform the uplink transmission. The channel sensing operation may be performed immediately before the uplink transmission of the terminal. The preset time for the channel sensing operation may be one of 9 us, 16 us, or 25 us. The terminal may perform the channel sensing operation for a specific time or longer within the preset time. When it is determined that the corresponding channel is not used by another communication system and/or another communication node according to a result of the channel sensing operation, the terminal may perform the uplink transmission. When it is determined that the corresponding channel is used by another communication system and/or another communication node according to the result of the channel sensing operation, the terminal may not perform the uplink transmission.

When the uplink transmission period of the terminal exists within the channel occupancy time initiated by the base station, the terminal may perform the channel access procedure (e.g., channel sensing operation) based on the above-described scheme, and may perform uplink transmission based on a result thereof The channel occupancy time initiated by the base station may be referred to as 'BS-channel occupancy time'. When the uplink transmission period of the terminal does not exist within the BS-channel occupancy time, the terminal may perform a channel access procedure to secure a channel occupancy time. The channel occupancy time initiated (e.g., secured) by the terminal may be referred to as 'UE-channel occupancy time'. The channel access procedure for securing a UE-channel occupancy time may be the same as or similar to the channel access procedure of the base station for securing a BS-channel occupancy time.

The terminal may perform a channel sensing operation immediately before a start time of a fixed frame period (e.g., UE-fixed frame period) in order to secure a UE-channel occupancy time. The channel sensing operation may be performed to determine whether a corresponding channel is used by another communication system and/or another communication node. The channel sensing operation may be performed based on an energy detection scheme or a signal detection scheme. The channel sensing operation may be performed for a specific time or longer within a preset time. The preset time may be one of 5 us, 9 us, 16 us, or 25 us, and the specific time during which the channel sensing operation is performed within the preset time may be one of 4 us, 5 us, 9 us, or 16 us.

When it is determined that the corresponding channel is not used by another communication system and/or another communication node according to a result of the channel sensing operation, the terminal may transmit a channel and/or a signal and may secure a UE-channel occupancy time. The terminal may secure the UE-channel occupancy time within a fixed frame period after the fixed frame period in which the channel sensing operation is performed. For example, the terminal may perform a channel sensing operation in a fixed frame period #n−1 prior to a fixed frame period #n and may determine that the corresponding channel is available according to a result of the channel sensing operation. In this case, the terminal may secure a UE-channel occupancy time within the fixed frame period #n. The terminal may transmit a channel and/or a signal by using the UE-channel occupancy time. The transmission operation of the channel and/or signal using the UE-channel occupancy time may be terminated before an idle period. When it is confirmed that the corresponding channel is idle by performing a channel sensing operation immediately before the channel occupancy time, and the transmission operation of the channel and/or signal is terminated before an idle period, the terminal may secure the UE-channel occupancy time.

The base station may indicate to the corresponding terminal information indicating whether the uplink transmission period of the terminal exists within the BS-channel occupancy time (hereinafter referred to as 'channel access parameters'). The channel access parameters may include information indicating the BS-channel occupancy time, information indicating whether the uplink transmission period of the terminal exists within the UE-channel occupancy time, and/or information indicating a communication node (e.g., base station or terminal) initiating the channel occupancy time associated with the uplink transmission of the terminal. In exemplary embodiments, "the uplink transmission (e.g., uplink transmission period) exists within the channel occupancy time" may mean that the uplink transmission is associated with the channel occupancy time or that the uplink transmission is included in the channel occupancy time. The channel access parameters may be included in configuration information of a channel access procedure for uplink transmission of the terminal. The base station may transmit DCI including the channel access parameters. The DCI may be transmitted on a PDCCH (e.g., common PDCCH or dedicated PDCCH). Value(s) of field(s) included in the DCI may be used to indicate the channel access parameters.

The terminal may receive the DCI from the base station and may identify the channel access parameters included in the DCI. The DCI including the channel access parameters may be received in a common search space or a UE-specific search space. The terminal may identify the channel access parameters by using the value(s) of the field(s) in the DCI. The terminal may identify information related to channel access for uplink information (i.e., channel access-related information for uplink transmission) (e.g., channel access type, CP extension, and communication node initiating the channel occupancy time associated with the uplink transmission) based on the channel access parameters.

The base station may transmit DCI (e.g., scheduling DCI, UL DCI) including a UL grant indicating uplink transmission to the terminal. The UL DCI may include one or more information elements defined in Table 1 below. The UL DCI may be a DCI format 0_0, DCI format 0_1, or DCI format 0_2.

TABLE 1

| Information elements |
| --- |
| Information indicating a channel access procedure required for uplink transmission |
| Information indicating whether uplink transmission (e.g., uplink transmission period) is included in a channel occupancy time of the base station |
| Information indicating whether uplink transmission (e.g., uplink transmission period) is included in a channel occupancy time of the terminal |
| Information indicating whether a channel access procedure for securing a channel occupancy time of the terminal needs to be performed for uplink transmission |
| Information indicating whether a channel sensing operation of the terminal needs to be performed for uplink transmission |
| Information indicating a channel access type |
| Cyclic prefix (CP) extension-related information |
| Information indicating a communication node (e.g., base station or terminal) initiating a channel occupancy time associated with uplink transmission (e.g., uplink transmission scheduled by the UL DCI) |

The terminal may receive the UL DCI including the UL grant from the base station and may identify the channel access-related information for uplink transmission included in the UL DCI. The terminal may identify the information element(s) defined in Table 1 from the UL DCI.

The base station may inform the terminal of information indicating whether the UL DCI includes the information element(s) defined in Table 1. The above-described operation may be performed through a higher layer message (e.g., RRC message). For example, the base station may transmit a SIB1 or RRC message indicating a channel access mode (e.g., ChannelAccessMode-r16) set to 'semi-static'. When a channel access mode is set to 'semi-static', the UL DCI may include the 'information indicating a communication node initiating a channel occupancy time associated with uplink transmission' defined in Table 1. On the other hand, when a channel access mode set to 'dynamic' is indicated to the terminal, the UL DCI may not include the 'information indicating a communication node initiating a channel occupancy time associated with uplink transmission' defined in Table 1.

The terminal may receive the SIB1 and/or RRC message from the base station, and may identify the channel access mode configuration value (e.g., semi-static or dynamic) included in the SIB1 and/or RRC message. When a channel access mode is set to 'semi-static', the terminal may expect that the UL DCI received from the base station includes the 'information indicating a communication node initiating a channel occupancy time associated with uplink transmission'. When a channel access mode is set to 'dynamic', the terminal may expect that the UL DCI received from the base station does not include the 'information indicating a communication node initiating a channel occupancy time associated with uplink transmission'.

The base station may inform the channel access-related information for uplink transmission of the terminal by indicating information of a channel occupancy time through DCI. The base station may indicate the channel access-related information for uplink transmission through UL DCI (e.g., scheduling DCI). The base station may update the channel access-related information for uplink transmission indicated through the UL DCI by transmitting the channel access parameters. The base station may update the channel access-related information for uplink transmission based on the indication of the channel occupancy time by indicating the channel access-related information for uplink transmission through the UL DCI.

The terminal may receive the UL DCI including the channel access parameters and may identify the channel access-related information for uplink transmission based on the channel access parameters included in the UL DCI. The terminal may receive the channel access-related information for uplink transmission through the UL DCI. The terminal may update the channel access-related information for uplink transmission received through the UL DCI by receiving the information of the channel occupancy time. The terminal may update the channel access-related information for uplink transmission based on the reception of the information of the channel occupancy time by receiving the channel access-related information for uplink transmission through the UL DCI.

The channel access-related information for uplink transmission may be transmitted in one or more schemes. In this case, the terminal may perform a channel access procedure for uplink transmission by using the most recently received channel access-related information. When the channel access-related information for uplink transmission is not received through the UL DCI, the terminal may identify the channel access-related information for uplink transmission by using the information of the BS-channel occupancy time. When the channel access-related information for uplink transmission is received through UL DCI, the terminal may identify the channel access-related information for uplink transmission by using the information included in the UL DCI without using the information of the BS-channel occupancy time.

When it is indicated that the uplink transmission scheduled by the UL DCI is associated with a channel occupancy time initiated by the base station, the terminal may perform the uplink transmission without performing a channel sensing operation. When it is indicated that the uplink transmission scheduled by the UL DCI is associated with a channel occupancy time initiated by the base station, and it is indicated that a channel sensing operation for the uplink transmission is not required, the terminal may perform the uplink transmission without performing a channel sensing operation. When it is indicated that the uplink transmission scheduled by the UL DCI is associated with a channel occupancy time initiated by the base station, and it is indicated that a channel sensing operation is required for the uplink transmission, the terminal may perform a channel sensing operation and may perform the uplink transmission based on a result of the channel sensing operation. In the above-described exemplary embodiment, the indications may be included in the UL DCI. The base station may expect the uplink transmission to be performed based on the above-described scheme.

When it is indicated that the uplink transmission scheduled by the UL DCI is associated with a channel occupancy time initiated by the base station, the terminal may perform the uplink transmission without performing a channel access procedure for securing a UE-channel occupancy time. When it is indicated that the uplink transmission scheduled by the UL DCI is associated with a channel occupancy time initiated by the base station, the terminal may perform a channel access procedure within the BS-channel occupancy time and may perform the uplink transmission based on a result of the channel access procedure. The channel access procedure within the BS-channel occupancy time may include an operation of determining whether to perform a channel access operation according to an interval between the uplink transmission and the downlink transmission immediately before the uplink transmission or an interval between the uplink transmission and another uplink transmission immediately before the uplink transmission. The channel access procedure within the BS-channel occupancy time may include an operation of determining whether to perform a channel sensing operation according to an indication of the base station. The base station may expect the uplink transmission to be performed based on the above-described scheme.

When the base station indicates to the terminal that a channel access procedure for securing a UE-channel occupancy time for uplink transmission is not required, the terminal may perform the uplink transmission without performing a channel access procedure. When the base station indicates to the terminal that a channel sensing operation of the terminal is not required for uplink transmission, the terminal may perform the uplink transmission without performing a channel sensing operation. When the interval between the uplink transmission and the downlink transmission immediately before the uplink transmission or the interval between the uplink transmission and another uplink transmission immediately before the uplink transmission is less than a specific time, the terminal may perform the uplink transmission without performing a channel sensing operation. When the terminal does not perform a channel sensing operation for uplink transmission, the length of the uplink transmission period may be limited to a specific length or less.

When it is indicated that the uplink transmission scheduled by the UL DCI is not associated with a channel occupancy time initiated by the base station, the terminal may perform a channel sensing operation and may perform the uplink transmission based on a result of the channel sensing operation. When it is indicated that the uplink transmission scheduled by the UL DCI is not associated with a channel occupancy time initiated by the base station, the terminal may perform a channel access procedure for securing a UE-channel occupancy time and may perform the uplink transmission within the UE-channel occupancy time. The base station may expect the uplink transmission to be performed based on the above-described scheme. The channel access procedure for securing a UE-channel occupancy time may be the same as or similar to the channel access procedure for securing a BS-channel occupancy time. "The uplink transmission scheduled by the UL DCI is not associated with a channel occupancy time initiated by the base station" may mean that the uplink transmission scheduled by the UL DCI is associated with a channel occupancy time initiated by the terminal.

When the base station indicates to the terminal that a channel access procedure for securing a UE-channel occupancy time for uplink transmission is required, the terminal may perform the channel access procedure to secure a UE-channel occupancy time and may perform the uplink transmission within the UE-channel occupancy time. When the base station indicates to the terminal that a channel sensing operation of the terminal is required for uplink transmission, the terminal may perform the channel sensing operation and may perform the uplink transmission based on a result of the channel sensing operation. The base station may expect the uplink transmission to be performed based on the above-described scheme.

When it is indicated that the uplink transmission scheduled by the UL DCI is not associated with a channel occupancy time initiated by the base station, the terminal may perform a channel access procedure to secure a UE-channel occupancy time. When the base station instructs the terminal to secure a UE-channel occupancy time for uplink transmission, the terminal may perform a channel access procedure for securing a UE-channel occupancy time. The terminal may secure a UE-channel occupancy time by performing the channel access procedure and may perform the uplink transmission within the UE-channel occupancy time. The uplink transmission within the UE-channel occupancy time may be performed in the same or similar manner as the downlink transmission within the BS-channel occupancy time. The terminal may perform the uplink transmission by using the UE-channel occupancy time. The terminal may not perform the uplink transmission in an idle period other than the UE-channel occupancy time. The terminal may perform a channel sensing operation according to the channel access procedure in order to secure the UE-channel occupancy time. The base station may expect the uplink transmission to be performed based on the above-described scheme.

When the UE-channel occupancy time is secured by the channel access procedure, the terminal may transmit information on the UE-channel occupancy time to the base station. The information of the UE-channel occupancy time may be transmitted to the base station on a PUCCH and/or PUSCH.

Figure 14:
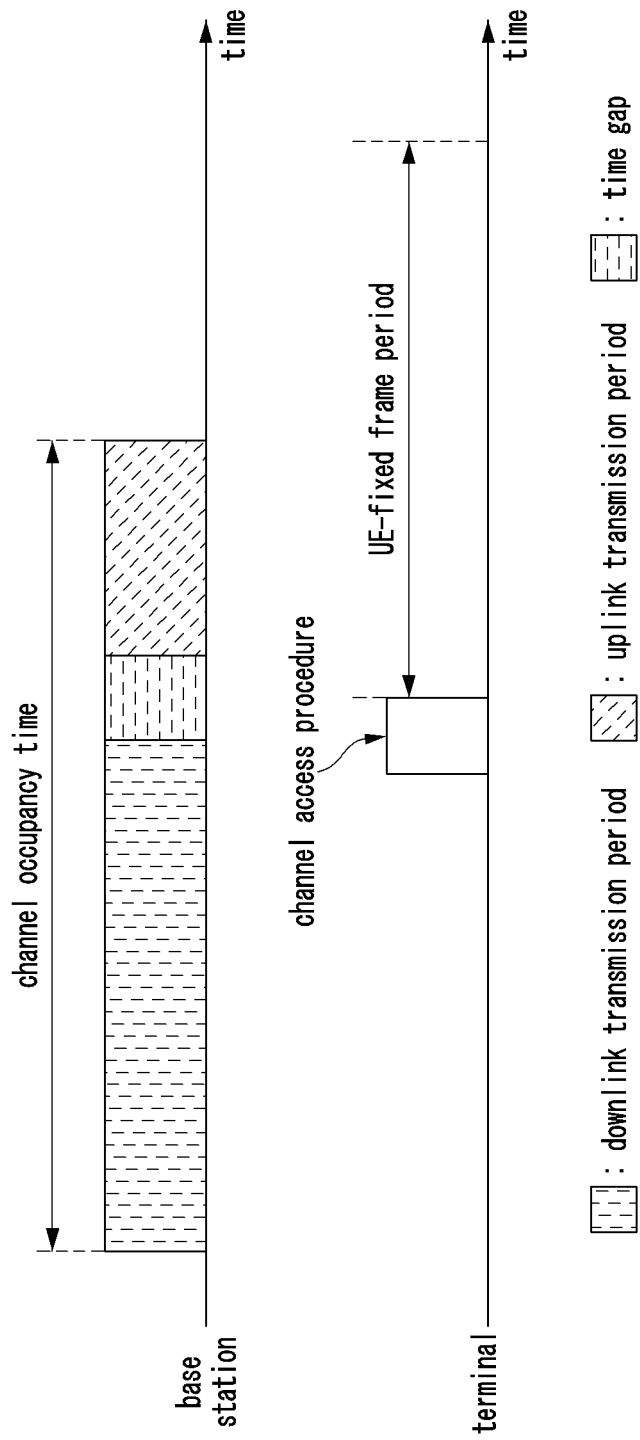
FIG. 14 is a conceptual diagram illustrating a first exemplary embodiment of a channel access procedure according to a channel occupancy time of a base station and a fixed frame period of a terminal.

FIG. 14 is a conceptual diagram illustrating a first exemplary embodiment of a channel access procedure according to a channel occupancy time of a base station and a fixed frame period of a terminal.

Referring to FIG. 14, a base station may secure a BS-channel occupancy time by performing a channel access procedure in an unlicensed band. The BS-channel occupancy time may include a downlink transmission period, a time gap, and an uplink transmission period. When uplink transmission is associated with the BS-channel occupancy time, the terminal may perform uplink transmission in the uplink transmission period within the BS-channel occupancy time.

According to configuration of the communication system, the uplink transmission period may overlap with a time period in which a periodic channel access procedure is performed based on the fixed frame period within the fixed time period in the exemplary embodiment of FIGS. 10 and/or 11. According to configuration of the communication system, each of a BS-fixed frame period, a start time of the BS-fixed frame period, a UE-fixed frame period, and a start time of the UE-fixed frame period may be configured independently. For example, the uplink transmission period may be included in the UE-channel occupancy time within the UE-fixed frame period. A start time of the uplink transmission may coincide with the start time of the UE-fixed frame period. The end time of the uplink transmission may be before a start time of the idle period within the UE-fixed frame period.

Hereinafter, a channel access procedure for uplink transmission and a method for securing (e.g., initiating) a channel occupancy time will be described. As in the exemplary embodiment of FIGS. 8 and/or 9, the uplink transmission may be performed periodically according to the configuration of the base station. In this case, the channel access procedure of the terminal may be performed as follows. If periodic uplink transmission configured (or activated) by the base station is associated with a BS-channel occupancy time, the terminal may perform a channel access procedure for uplink transmission within the BS-channel occupancy time and may perform the uplink transmission (e.g., periodic uplink transmission) configured by the base station based on a result of the channel access procedure. The periodic uplink transmission may mean configured uplink transmission.

In order to indicate whether the periodic uplink transmission exists within the BS-channel occupancy time, the base station may transmit a separate signaling message to the terminal. The terminal may receive, from the base station, a signaling message indicating whether the uplink transmission (e.g., periodic uplink transmission) exists within the channel occupancy time initiated by the base station. When the signaling operation of the above-described information is not configured or when the above-mentioned signaling message is not received, the terminal may identify information of the BS-channel occupancy time based on the configuration information of the BS-fixed frame period and whether the base station performs downlink transmission. When the base station starts transmission of a channel and/or a signal at a start time of the BS-channel occupancy time, and the transmission of the channel and/or signal of the base station is terminated before a start time of an idle period, the terminal may determine that the channel occupancy time has been secured by the base station.

When the uplink transmission (e.g., configured uplink transmission) occurs at a start time of a UE-fixed frame period and the uplink transmission is terminated before an idle period, the terminal may determine that the uplink transmission is to be performed using the UE-channel occupancy time or the BS-channel occupancy time based on the following condition(s). For example, when the uplink transmission (e.g., configured uplink transmission) occurs within the BS-fixed frame period, the uplink transmission is terminated before an idle period of the BS-fixed frame period, and it is determined that the base station has initiated the BS-channel occupancy time within the BS-fixed frame period, the terminal may determine that the uplink transmission is to be performed using the BS-channel occupancy time. If the above-described condition(s) are not satisfied, the terminal may determine that the uplink transmission is to be performed using the UE-channel occupancy time. The base station may expect the uplink transmission to be performed based on the above-described scheme.

When the uplink transmission (e.g., configured uplink transmission) occurs at a start of the UE-fixed frame period, the uplink transmission overlaps with an idle period of the BS-fixed frame period, the terminal may perform the uplink transmission by using the BS-channel occupancy time when the following condition(s) are satisfied. When the uplink transmission (e.g., configured uplink transmission) occurs within the BS-fixed frame period, the uplink transmission is terminated before the idle period of the BS-fixed frame period, and it is determined that the base station has initiated the BS-channel occupancy time within the BS-fixed frame period, the terminal may perform the uplink transmission within the BS-channel occupancy time. When the above-described condition(s) are not satisfied, the terminal may not perform the uplink transmission. The base station may expect the uplink transmission to be performed based on the above-described scheme.

When the uplink transmission (e.g., configured uplink transmission) occurs after the UE-fixed frame period and the uplink transmission is terminated before an idle period of the UE-fixed frame period, the terminal may perform the uplink transmission by using the BS-channel occupancy time or the UE-channel occupancy time based on the following condition(s). When the UE-channel occupancy time is initiated, the terminal may determine that the uplink transmission is to be performed using the UE-channel occupancy time. When the UE-channel occupancy time is not initiated, the uplink transmission (e.g., configured uplink transmission) occurs within the BS-fixed frame period, the uplink transmission is terminated before the idle period of the BS-fixed frame period, and it is determined that the base station has initiated the BS-channel occupancy time, the terminal may determine that the uplink transmission is to be performed using the BS-channel occupancy time. The base station may expect the uplink transmission to be performed based on the above-described scheme.

When the uplink transmission (e.g., configured uplink transmission) occurs after the start time of the UE-fixed frame period, and the uplink transmission overlaps with the idle period of the UE-fixed frame period, the terminal may perform the uplink transmission using the BS-channel occupancy time when the following condition(s) are satisfied. When the uplink transmission (e.g., configured uplink transmission) occurs within the BS-fixed frame period, the uplink transmission is terminated before an idle period of the BS-fixed frame period, and it is determined that the base station has initiated the BS-channel occupancy time, the terminal may determine that the uplink transmission is to be performed using the BS-channel occupancy time. When the above-described condition(s) are not satisfied, the terminal may not perform the uplink transmission. The base station may expect the uplink transmission to be performed based on the above-described scheme.

When the uplink transmission is outside the BS-channel occupancy time or BS-fixed frame period or when the uplink transmission is not terminated before the idle period of the BS-channel occupancy time or BS-fixed frame period, the terminal may perform a channel access procedure to secure a channel occupancy time for the uplink transmission. The channel access procedure for securing a channel occupancy time may refer to the channel access procedure using a fixed frame period in the exemplary embodiments of FIGS. 10 to 12. The channel access procedure for securing a channel occupancy time may refer to the procedure for securing a UE-channel occupancy time described above.

Hereinafter, a channel access procedure of the terminal for uplink transmission based on scheduling (e.g., scheduling DCI, UL DCI) will be described. As in the exemplary embodiment of FIG. 7, the terminal may receive scheduling information for uplink transmission from the base station and may perform the uplink transmission based on the scheduling information. A channel access procedure of the terminal for scheduling-based uplink transmission based on the configuration shown in FIG. 14 will be described. For scheduling-based uplink transmission, the base station may transmit scheduling information (e.g., DCI) using a physical layer message. The scheduling information may include channel access-related information for uplink transmission. The channel access-related information may include at least one of information indicating whether the uplink transmission occurs within the BS-channel occupancy time or UE-channel occupancy time, information indicating a communication node (e.g., base station or terminal) initiating the channel occupancy time during which the uplink transmission occurs, information indicating a channel access procedure for the uplink transmission, information indicating a type of channel sensing operation, information indicating a length of a time period during which the channel sensing operation is performed, CP extension-related information for uplink transmission, a priority index of uplink transmission, or a combination thereof. The base station may transmit scheduling DCI (e.g., UL DCI) including the channel access-related information. The terminal may receive the scheduling DCI from the base station and may identify the channel access-related information included in the scheduling DCI. The terminal may perform a channel access procedure (e.g., channel sensing operation) for uplink transmission based on the channel access-related information.

The channel access procedure for uplink transmission may be indicated as one of a channel access procedure using a BS-channel occupancy time or a channel access procedure for securing a UE-channel occupancy time. The channel access procedure using a BS-channel occupancy time may refer to a channel access procedure performed by the terminal for uplink transmission within the BS-channel occupancy time. The channel access procedure for securing a UE-channel occupancy time may refer to the channel access procedure for securing a channel occupancy time using a UE-fixed frame period in the exemplary embodiments of FIGS. 10 to 12.

The channel access-related information for uplink transmission may be included in the scheduling DCI according to configuration of a higher layer message (e.g., RRC message). The base station may inform the terminal of information indicating whether or not the channel access-related information for uplink transmission is included in the scheduling DCI using a higher layer message. The terminal may receive the higher layer message from the base station and may identify whether the channel access-related information for uplink transmission is included in the scheduling DCI based on the information included in the higher layer message.

According to configuration of the communication system, the scheduling DCI may not include the channel access-related information for uplink transmission. When the channel access-related information for uplink transmission is not obtained from the scheduling DCI or when the higher layer message indicating whether or not the channel access-related information for uplink transmission is included in the scheduling DCI is not received, The terminal may identify the channel access-related information for uplink transmission by using information of a BS-channel occupancy time.

For example, when the uplink transmission scheduled by the base station is associated with a BS-channel occupancy time, the terminal may perform a channel access procedure for uplink transmission within a UE-channel occupancy time and may perform the uplink transmission based on a result of the channel access procedure. The base station may transmit, to the terminal, a signaling message indicating whether the uplink transmission is associated with a BS-channel occupancy time. The terminal may receive, from the base station, the signaling message indicating whether the uplink transmission is associated with a BS-channel occupancy time. When the above-described signaling operation is not configured or when the above-described signaling message is not received, the terminal may identify information on the BS-channel occupancy time based on configuration of the BS-fixed frame period and whether the base station performs downlink transmission. When transmission of a channel and/or a signal of the base station starts at a start time of the BS-fixed frame period (e.g., a start time of the BS-channel occupancy time), and the transmission of the channel and/or signal is terminated before a start time of an idle period of the BS-fixed frame period, the terminal may determine that the base station has secured the channel occupancy time.

When the uplink transmission is out of the BS-channel occupancy time or BS-fixed frame period or when the uplink transmission is not terminated before the idle period of the BS-channel occupancy time or BS-fixed frame period, the terminal may perform a channel access procedure to secure a channel occupancy time for uplink transmission. In case the uplink transmission is performed using a UE-channel occupancy time according to the indication of the base station, the terminal may perform the uplink transmission by using an already secured UE-channel occupancy time. Alternatively, in the above-described case, the terminal may secure a UE-channel occupancy time and may perform the uplink transmission in the UE-channel occupancy time. The base station may expect the uplink transmission to be performed based on the above-described scheme. The channel access procedure for securing a UE-channel occupancy time may mean the channel access procedure using a UE-fixed frame period in the exemplary embodiments of FIGS. 10 to 12.

When the base station indicates that uplink transmission is associated with the BS-channel occupancy time, and the base station indicates that the uplink transmission is to be performed after a channel sensing operation, the terminal may perform the uplink transmission according to the following procedure. When a difference between a start time of the uplink transmission and an end time of the previous uplink transmission is equal to or less than 16 us, the terminal may perform the uplink transmission without performing a channel sensing operation. If the above-described condition(s) are not satisfied, the terminal may perform a channel sensing operation for 9 us within a 25 us period immediately before the uplink transmission. When a result of the channel sensing operation indicates an idle state, the terminal may perform the uplink transmission. When the result of the channel sensing operation does not indicate an idle state, the terminal may not perform the uplink transmission. The base station may expect the uplink transmission to be performed based on the above-described scheme.

When it is indicated by the base station that uplink transmission is associated with the UE-channel occupancy time, the terminal may perform the uplink transmission according to the following procedure. When the uplink transmission occurs at a start time of the UE-fixed frame period, the terminal may perform a channel sensing operation for at least 9 us immediately before the uplink transmission. When a result of the channel sensing operation indicates an idle state, the terminal may perform the uplink transmission. When the result of the channel sensing operation does not indicate an idle state, the terminal may not perform the uplink transmission. When the uplink transmission occurs after the start time of the UE-fixed frame period and the terminal fails to initiate a channel occupancy time within the UE-fixed frame period, the terminal may not perform the uplink transmission. When the uplink transmission occurs after the start time of the UE-fixed frame period, the terminal initiates a channel occupancy time within the UE-fixed frame period, and a difference between a start time of the uplink transmission and an end time of the previous uplink transmission is equal to or less than 16 us, the terminal may perform the uplink transmission without performing a channel sensing operation. When the uplink transmission occurs after the start time of the UE-fixed frame period, the terminal may initiate a channel occupancy time within the UE-fixed frame period, and a difference between the start time of the uplink transmission and the end time of the previous uplink transmission exceeds 16 us, the terminal may perform a channel sensing operation for at least 9 us immediately before the uplink transmission. When a result of the channel sensing operation indicates an idle state, the terminal may perform the uplink transmission. When the result of the channel sensing operation does not indicate an idle state, the terminal may not perform the uplink transmission. The base station may expect the uplink transmission to be performed based on the above-described scheme.

Figure 15:
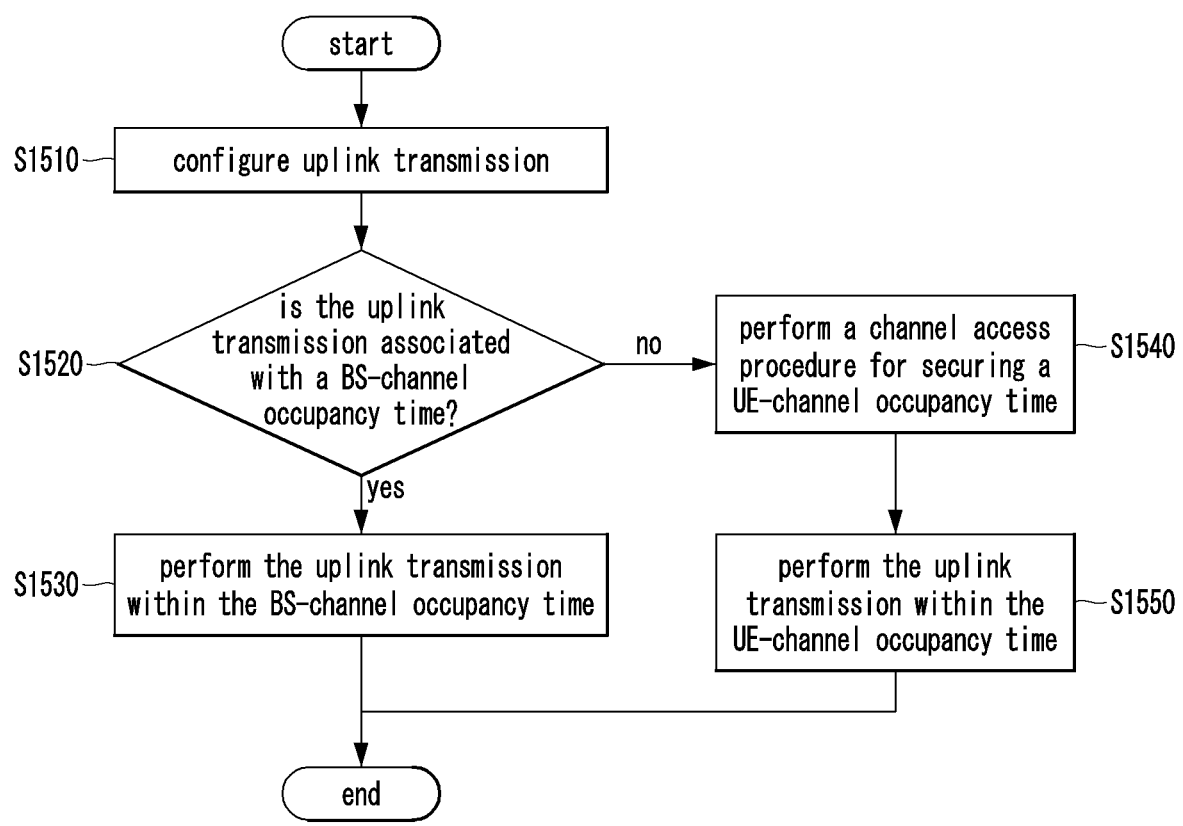
FIG. 15 is a flowchart illustrating a first exemplary embodiment of a channel access procedure of a terminal in a communication system.

FIG. 15 is a flowchart illustrating a first exemplary embodiment of a channel access procedure of a terminal in a communication system.

Referring to FIG. 15, a base station may configure periodic uplink transmission (e.g., configured uplink transmission) to a terminal. The terminal may receive configuration information of the periodic uplink transmission from the base station and may configure the periodic uplink transmission based on the configuration information (S1510). The configuration information of the periodic uplink transmission may be received through a higher layer message. The terminal may determine whether the uplink transmission (e.g., configured uplink transmission) is associated with a BS-channel occupancy time (S1520). When the uplink transmission is associated with a BS-channel occupancy time, the terminal may perform the uplink transmission within the BS-channel occupancy time (S1530). In step S1530, the terminal may perform a channel access procedure (e.g., channel sensing operation) for the uplink transmission within the BS-channel occupancy time, and may perform the uplink transmission based on a result of the channel access procedure. When the uplink transmission is not associated with a BS-channel occupancy time, the terminal may perform a channel access procedure for securing a UE-channel occupancy time (S1540). When a channel occupancy time of the terminal is secured by the channel access procedure, the terminal may perform the uplink transmission in the UE-channel occupancy time (S1550). On the other hand, when the UE-channel occupancy time is not secured, the terminal may not perform the uplink transmission.

Figure 16:
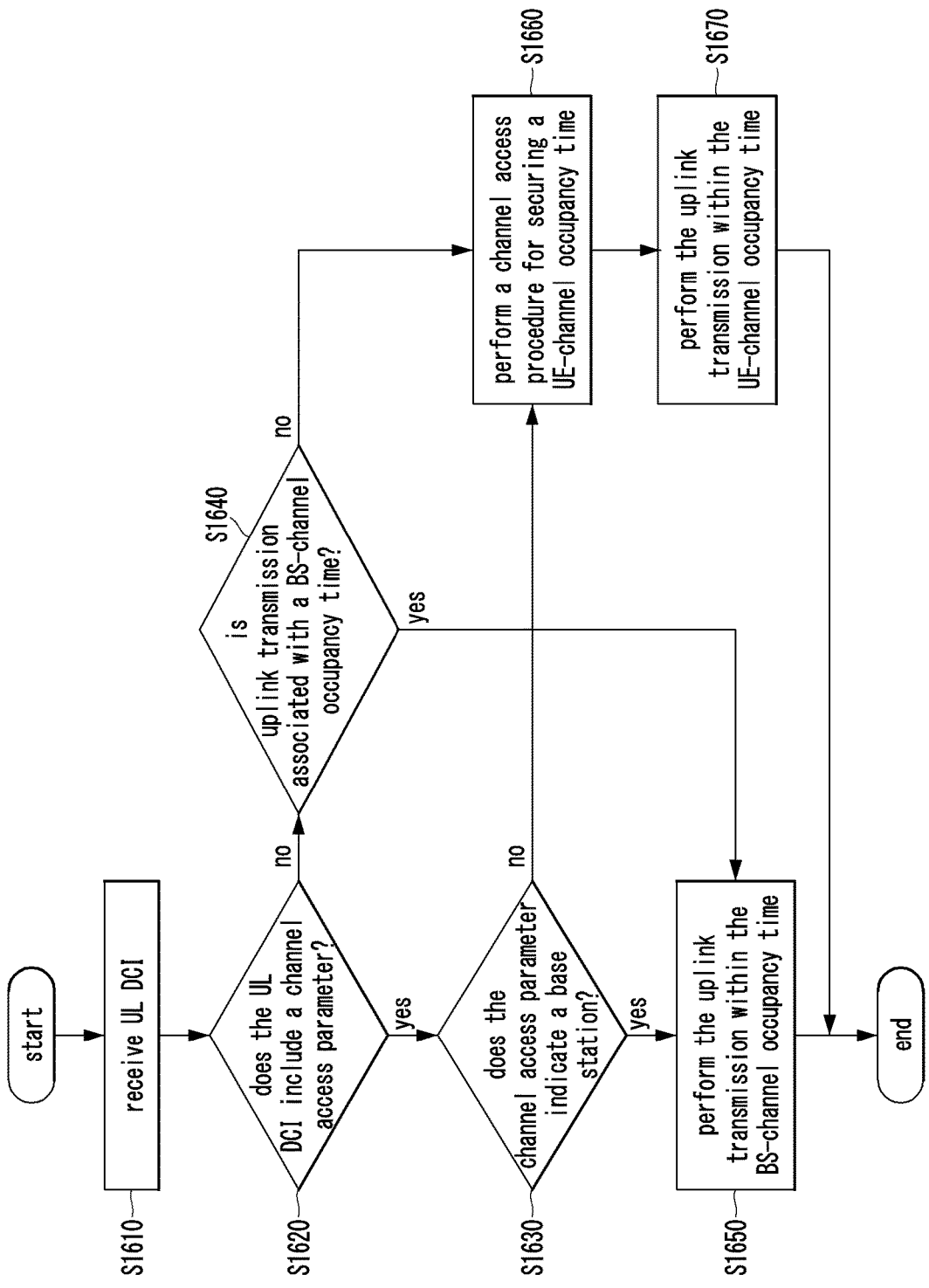
FIG. 16 is a flowchart illustrating a second exemplary embodiment of a channel access procedure of a terminal in a communication system.

FIG. 16 is a flowchart illustrating a second exemplary embodiment of a channel access procedure of a terminal in a communication system.

Referring to FIG. 16, a terminal may receive scheduling information for uplink transmission from a base station (S1610). The scheduling information may be received through scheduling DCI (e.g., UL DCI). The terminal may determine whether the scheduling DCI includes channel access parameters for uplink transmission (S1620). The channel access parameters may indicate a communication node (e.g., base station or terminal) initiating a channel occupancy time associated with the uplink transmission scheduled by the scheduling DCI.

When the channel access parameters are included in the scheduling DCI, the terminal may determine whether the communication node (e.g., communication node initiating a channel occupancy time) indicated by the channel access parameters is the base station (S1630). When the channel access parameters indicate the base station, the terminal may perform the uplink transmission scheduled by the scheduling DCI within a BS-channel occupancy time (S1650). In step S1650, the terminal may perform a channel access procedure in the BS-channel occupancy time and may perform the uplink transmission based on a result of the channel access procedure. When the channel access parameters indicate the terminal, the terminal may secure a UE-channel occupancy time by performing a channel access procedure (S1660). The terminal may perform the uplink transmission within the UE-channel occupancy time (S1670).

When it is determined that the scheduling DCI does not include the channel access parameters in step S1620, the terminal may determine whether the uplink transmission (e.g., uplink transmission period) is associated with a BS-channel occupancy time (S1640). When the uplink transmission is associated with a BS-channel occupancy time, the terminal may perform the uplink transmission scheduled by the scheduling DCI within the BS-channel occupancy time (S1650). When the uplink transmission is not associated with a BS-channel occupancy time, the terminal may secure a UE-channel occupancy time by performing a channel access procedure (S1660). The terminal may perform the uplink transmission within the UE-channel occupancy time (S1670).

Figure 17:
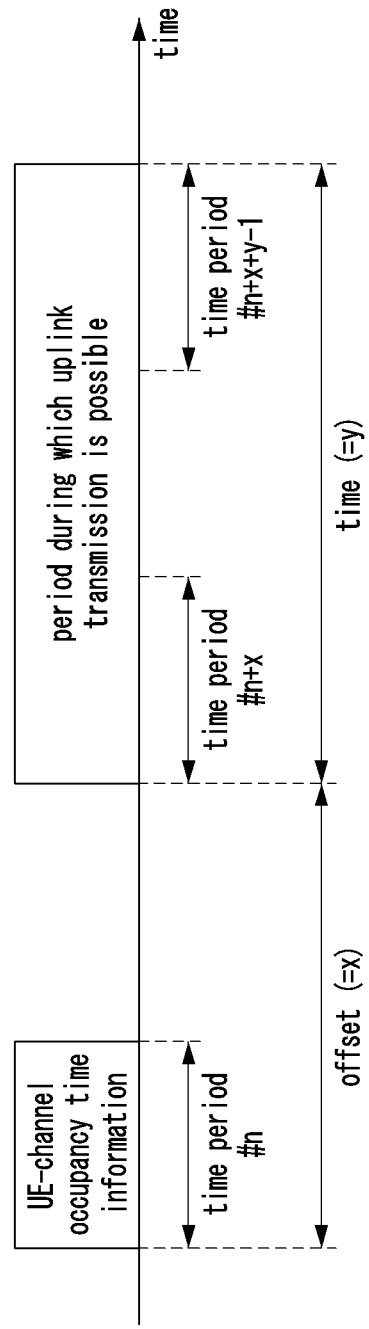
FIG. 17 is a conceptual diagram illustrating a first exemplary embodiment of a method for configuring UE-channel occupancy time information.

FIG. 17 is a conceptual diagram illustrating a first exemplary embodiment of a method for configuring UE-channel occupancy time information.

Referring to FIG. 17, information on a UE-channel occupancy time (i.e., UE-channel occupancy time information) may be information on a channel occupancy time initiated by a terminal. The UE-channel occupancy time information may include at least one of information indicating a time point at which downlink transmission can be started, information indicating a length of a period in which the downlink transmission is possible, or information indicating a priority class of data available for the downlink transmission.

The information indicating the time point at which the downlink transmission can be stated may be a time offset from uplink transmission including the UE-channel occupancy time information to the time point at which the downlink transmission can be started. For example, when the UE-channel occupancy time information is transmitted in a time period #n, and a period in which downlink transmission using the UE-channel occupancy time is possible starts from a time period #n+x, the terminal may inform a time offset x from the time period #n to the time period #n+x to the base station. The time offset may be set in units of slots or symbols. Each of n and x may be a natural number.

The information indicating the length of the period in which the downlink transmission is possible may indicate a time period in which the downlink transmission of the base station is possible within the UE-channel occupancy time. For example, when the UE-channel occupancy time information is transmitted in the time period #n, the start time of the period in which the downlink transmission is possible is the time period #(n+x), and the length of the period in which the downlink transmission is possible is y, the terminal may inform the base station that the downlink transmission is possible in a time period from the time period #(n+x) to a time period #(n+x+y−1). In this case, the terminal may inform the base station of y, which is the length of the period in which the downlink transmission is possible. y may be set in units of slots or symbols and may be a natural number.

The information indicating the priority class of the data available for the downlink transmission may vary according to a channel access procedure performed to secure the UE-channel occupancy time. The terminal may perform a channel access procedure to secure a channel occupancy time for uplink transmission. In this case, the channel access procedure may vary according to a priority class of the data to be used for the uplink transmission. The terminal may not transmit data of a lower priority class within a channel occupancy time secured through a channel access procedure performed for a higher priority class. The terminal may transmit data of a higher priority class within a channel occupancy time secured through a channel access procedure performed for a lower priority class. The terminal may transmit to the base station information of a priority class of data used for a channel access procedure for securing a channel occupancy time. The priority class of data may be set in a class unit.

The base station may transmit a higher layer message (e.g., RRC message) to the terminal in order to receive the UE-channel occupancy time information. The higher layer message may indicate to enable or disable a transmission operation of the UE-channel occupancy time information. The UE-channel occupancy time information may be configured in a table form through a higher layer message. In this case, the UE-channel occupancy time information may be preconfigured in a table, and the base station may inform the terminal of configuration information of the table.

When a higher layer message indicating disabling of the transmission operation of the UE-channel occupancy time information is received from the base station, the terminal may not transmit the UE-channel occupancy time information to the base station. When a higher layer message indicating enabling of the transmission operation of the UE-channel occupancy time information is received from the base station, the terminal may transmit the UE-channel occupancy time information to the base station. Alternatively, the terminal may receive, from the base station, a higher layer message indicating that the UE-channel occupancy time information is configured in a table form. For example, the terminal may receive the configuration information of the table for the UE-channel occupancy time information from the base station. The terminal may transmit an index indicating element(s) within the table to the base station. That is, the terminal may identify element(s) corresponding to the channel occupancy time secured by the terminal from among the elements in the table, and may transmit an index corresponding to the identified element(s) to the base station.

The base station may receive the UE-channel occupancy time information (e.g., a specific index in the table) from the terminal, and may perform downlink transmission based on the received information. The terminal may receive a downlink channel and/or signal from the base station based on the UE-channel occupancy time information.

The base station may identify a period in which the downlink transmission is possible by interpreting the UE-channel occupancy time information indicated by the terminal, and may transmit information indicating the period in which the downlink transmission is possible (hereinafter referred to as 'downlink transmission period information') to the terminal. The base station may transmit the downlink transmission period information to the terminal on a downlink control channel. The downlink transmission period information may be transmitted on a common downlink control channel.

The terminal may receive the downlink transmission period information from the base station. The downlink transmission period information may be received on a downlink control channel (e.g., common downlink control channel). The terminal may identify the period in which the downlink transmission is possible based on the downlink transmission period information, and may perform a downlink reception operation in the identified downlink transmission period. When the terminal initiates a UE-channel occupancy time for the identified downlink transmission period and a downlink time period is indicated by the base station, the terminal may interpret the downlink time period indicated by the base station as the UE-channel occupancy time. When the terminal initiates a UE-channel occupancy time for the identified downlink transmission period and a downlink time period is indicated by the base station, the terminal may interpret the downlink time period indicated by the base station as not a BS-channel occupancy time. Based on the above-described operation, the terminal may perform a downlink reception operation in the UE-channel occupancy time within the downlink transmission period.

The base station may interpret the UE-channel occupancy time information indicated by the terminal to identify the period in which the downlink transmission is possible, and may not transmit information on the identified downlink transmission period to the terminal. In this case, the base station may transmit information indicating that the identified downlink transmission period is not a period for downlink transmission (hereinafter referred to as 'non-downlink transmission period information') to the terminal. The non-downlink transmission period information may be transmitted on a downlink control channel (e.g., common downlink control channel).

The terminal may receive the non-downlink transmission period information from the base station. The non-downlink transmission period information may be received on a downlink control channel (e.g., common downlink control channel). The terminal may perform a downlink reception operation even in a period indicated by the non-downlink transmission period information. When the terminal initiates a UE-channel occupancy time for a time period, and the time period is not indicated by the base station as a downlink time period, the terminal may interpret the time period as the UE-channel occupancy time. The terminal may perform a downlink reception operation in a time period in which downlink communication is possible within the UE-channel occupancy time. When the terminal initiates a UE-channel occupancy time for a time period and the time period is indicated by the base station as a time period other than a downlink time period, the terminal may interpret the time period as the UE-channel occupancy time. The terminal may perform a downlink reception operation in a time period in which downlink communication is possible within the UE-channel occupancy time.

When the time period is indicated by the base station as a time period other than a downlink time period, the time period belongs to the UE-channel occupancy time, and downlink communication is possible in the time period, the terminal may determine the time period as a downlink period. The terminal may perform a downlink reception operation in the time period based on the above-described determination.

Figure 18:
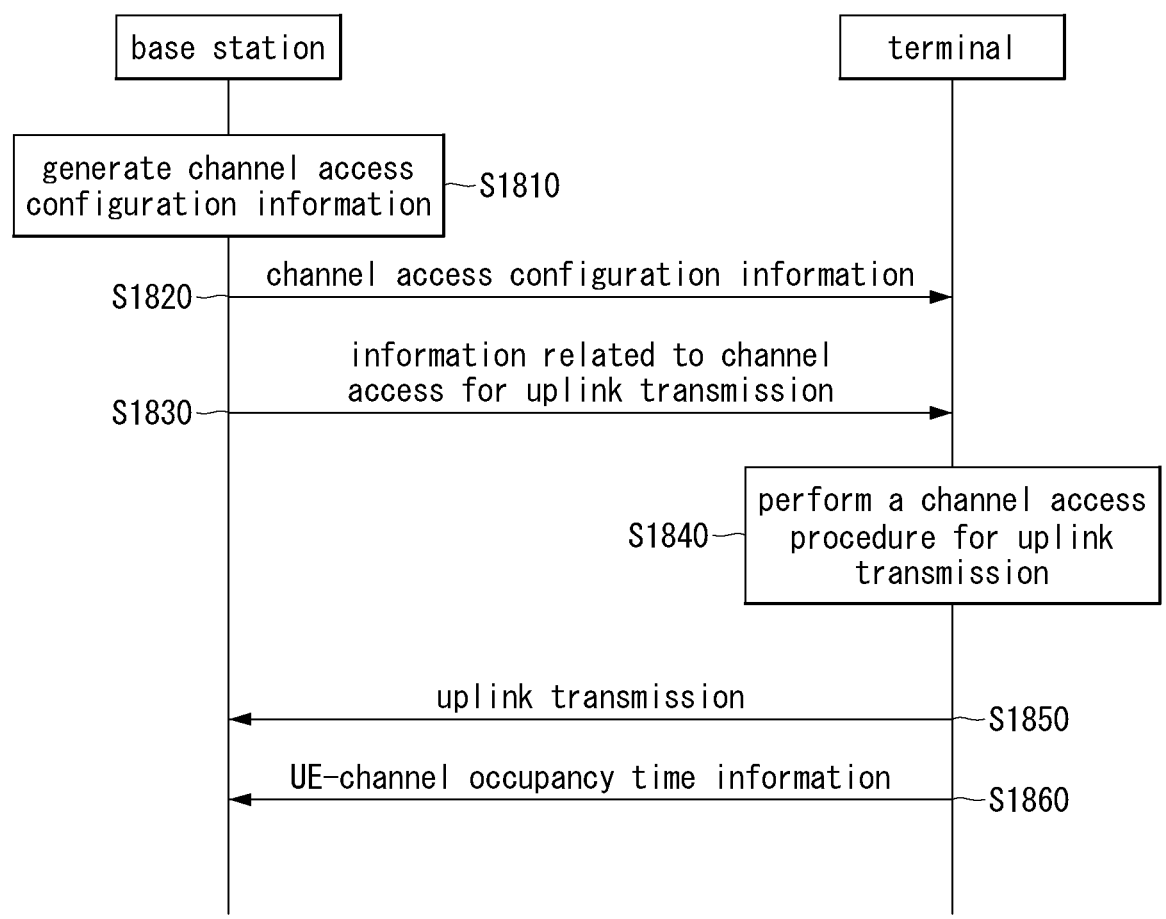
FIG. 18 is a flowchart illustrating a third exemplary embodiment of a channel access procedure of a terminal in a communication system.

FIG. 18 is a flowchart illustrating a third exemplary embodiment of a channel access procedure of a terminal in a communication system.

Referring to FIG. 18, a base station may generate channel access configuration information (e.g., SemiStaticChannelAccessConfig, ue-SemiStaticChannelAccessConfig, and/or ChannelAccessMode) for a terminal (S1810). The base station may transmit the channel access configuration information to the terminal (S1820). The terminal may receive the channel access configuration information from the base station. Also, the base station may transmit channel access-related information (e.g., channel access parameters) for uplink transmission to the terminal (S1830). The terminal may receive the channel access-related information from the base station. The terminal may perform a channel access procedure for uplink transmission based on the information received in steps S1820 and S1830 (S1840). The terminal may perform uplink transmission according to the channel access procedure (S1850). When a UE-channel occupancy time is secured according to the channel access procedure, the terminal may transmit information of the UE-channel occupancy time to the base station (S1860). The step S1860 may be selectively performed.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving, from a base station, a higher layer message including information used for indicating whether downlink control information (DCI) includes a channel access parameter used for identifying a communication node initiating a channel occupancy time;

receiving (the DCI) for scheduling uplink transmission from the base station;

identifying the communication node initiating the channel occupancy time associated with the uplink transmission based on the channel access parameter included in the DCI when the information included in the higher layer message indicates that the DCI includes the channel access parameter; and performing the uplink transmission scheduled by the DCI within the channel occupancy time initiated by the communication node, wherein the communication node is the terminal or the base station.

2. The operation method according to claim 1, wherein the performing of the uplink transmission comprises performing the uplink transmission without performing a channel sensing operation when the channel occupancy time is initiated by the base station and a time gap between a previous uplink transmission of the terminal and the uplink transmission is less than a preset time.

3. The operation method according to claim 1, wherein the performing of the uplink transmission comprises:

performing a channel sensing operation when the channel occupancy time is initiated by the base station and a time gap between a previous uplink transmission of the terminal and the uplink transmission is equal to or greater than a preset time; and when a result of the channel sensing operation indicates an idle state, performing the uplink transmission.

4. The operation method according to claim 1, wherein the performing of the uplink transmission comprises:

performing a channel sensing operation when the channel occupancy time is initiated by the terminal and the uplink transmission occurs at a start time of a user equipment (UE) period of duration configured by the terminal; and when a result of the channel sensing operation indicates an idle state, performing the uplink transmission.

5. The operation method according to claim 1, wherein the performing of the uplink transmission comprises performing the uplink transmission without performing a channel sensing operation when the channel occupancy time is initiated by the terminal, the uplink transmission occurs after a start time of a UE period of duration configured by the terminal, and a time gap between a previous uplink transmission of the terminal and the uplink transmission is less than a preset time.

6. The operation method according to claim 1, wherein the performing of the uplink transmission comprises:

performing a channel sensing operation when the channel occupancy time is initiated by the terminal, the uplink transmission occurs after a start time of a UE period of duration configured by the terminal, and a time gap between a previous uplink transmission of the terminal and the uplink transmission is equal to or greater than a preset time; and when a result of the channel sensing operation indicates an idle state, performing the uplink transmission.

7. The operation method according to claim 1, wherein the higher layer message further includes periodicity information indicating a periodicity of the channel occupancy time initiated by the terminal and offset information indicating an offset between a start time of an even-numbered radio frame and a start time of a first.

8. An operation method of a base station in a communication system, the operation method comprising:

transmitting, to a terminal, a higher layer message including information used for indicating whether downlink control information (DCI) includes a channel access parameter used for identifying a communication node initiating a channel occupancy time;

generating the channel access parameter indicating the communication node initiating the channel occupancy time associated with uplink transmission;

transmitting the DCI including the channel access parameter and scheduling information of the uplink transmission to the terminal; and performing a reception operation for the uplink transmission scheduled by the DCI within the channel occupancy time initiated by the communication node, wherein the communication node is the terminal or the base station.

9. The operation method according to claim 8, wherein the uplink transmission is expected to be performed without performing a channel sensing operation when the channel occupancy time is initiated by the base station and a time gap between a previous uplink transmission of the terminal and the uplink transmission is less than a preset time.

10. The operation method according to claim 8, wherein the uplink transmission is expected to be performed according to a result of a channel sensing operation when the channel occupancy time is initiated by the base station and a time gap between a previous uplink transmission of the terminal and the uplink transmission is equal to or greater than a preset time. period of the channel occupancy time.

11. The operation method according to claim 8, wherein the uplink transmission is expected to be performed according to a result of a channel sensing operation when the channel occupancy time is initiated by the terminal and the uplink transmission occurs at a start time of a user equipment (UE) period of duration configured by the terminal.

12. The operation method according to claim 8, wherein the uplink transmission is expected to be performed without performing a channel sensing operation when the channel occupancy time is initiated by the terminal, the uplink transmission occurs after a start time of a user equipment (UE) period of duration configured by the terminal, and a time gap between a previous uplink transmission of the terminal and the uplink transmission is less than a preset time.

13. The operation method according to claim 8, wherein the uplink transmission is expected to be performed according to a result of a channel sensing operation when the channel occupancy time is initiated by the terminal, the uplink transmission occurs after a start time of a user equipment (UE) period of duration configured by the terminal, and a time gap between a previous uplink transmission of the terminal and the uplink transmission is equal to or greater than a preset time.

14. The operation method according to claim 8, wherein the higher layer message further includes periodicity information indicating a periodicity of the channel occupancy time initiated by the terminal and offset information indicating an offset between a start time of an even-numbered radio frame and a start time of a first period of the channel occupancy time.

15. A terminal in a communication system, the terminal comprising:

a processor;

a memory electronically communicating with the processor; and instructions stored in the memory, wherein when executed by the processor, the instructions cause the terminal to:

receive, from a base station, a higher layer message including periodicity information indicating a periodicity of a channel occupancy time initiated by the terminal and offset information indicating an offset between a start time of an even-numbered radio frame and a start time of a first period of the channel occupancy time;

receive downlink control information (DCI) for scheduling uplink transmission from the base station;

identify a communication node initiating the channel occupancy time associated with the uplink transmission based on a channel access parameter included in the DCI; and perform the uplink transmission scheduled by the DCI within the channel occupancy time initiated by the communication node, wherein the communication node is the terminal or the base station, and the channel occupancy time initiated by the terminal is determined based on the periodicity information and the offset information.

16. The terminal according to claim 15, wherein the higher layer message further includes information used for indicating whether the DCI includes the channel access parameter used for identifying the communication node initiating the channel occupancy time.

17. The terminal according to claim 15, wherein in the performing of the uplink transmission, the instructions further cause the terminal to perform the uplink transmission without performing a channel sensing operation when the channel occupancy time is initiated by the base station and a time gap between a previous uplink transmission of the terminal and the uplink transmission is less than a preset time.

18. The terminal according to claim 15, wherein in the performing of the uplink transmission, the instructions further cause the terminal to:

perform a channel sensing operation when the channel occupancy time is initiated by the base station and the uplink transmission occurs at a start time of a user equipment (UE) period of duration configured by the terminal; and perform the uplink transmission when a result of the channel sensing operation is determined to be an idle state.

* * * * *